US006931070B2

(12) United States Patent
Moore

(10) Patent No.: US 6,931,070 B2
(45) Date of Patent: Aug. 16, 2005

(54) TRANSITION TEMPLATES FOR COMPRESSED DIGITAL VIDEO AND METHOD OF GENERATING THE SAME

(75) Inventor: Kevin Moore, Lyneham (AU)

(73) Assignee: Mediaware Solutions Pty Ltd. (AU)

( * ) Notice: Subject to any disclaimer, the term of this patent is extended or adjusted under 35 U.S.C. 154(b) by 599 days.

(21) Appl. No.: 09/986,759

(22) Filed: Nov. 9, 2001

(65) Prior Publication Data

US 2002/0061065 A1 May 23, 2002

(30) Foreign Application Priority Data

Nov. 9, 2000 (AU) .............................................. PR1337

(51) Int. Cl.$^7$ ................................................. H04N 7/18
(52) U.S. Cl. .............................. 375/240.25; 375/240.29
(58) Field of Search ........................ 375/240.12–240.29

(56) References Cited

U.S. PATENT DOCUMENTS

| | | | |
|---|---|---|---|
| 5,559,562 A | | 9/1996 | Ferster |
| 5,635,982 A | * | 6/1997 | Zhang et al. .......... 348/231.99 |
| 5,959,690 A | | 9/1999 | Toebes, VIII et al. |
| 5,990,980 A | * | 11/1999 | Golin ........................ 348/700 |
| 6,169,573 B1 | * | 1/2001 | Sampath-Kumar et al. . 348/169 |
| 6,449,392 B1 | * | 9/2002 | Divakaran et al. .......... 382/235 |
| 6,459,459 B1 | * | 10/2002 | Ratakonda ................... 348/700 |
| 6,654,067 B1 | * | 11/2003 | Mc Gee et al. ............. 348/700 |
| 6,714,594 B2 | * | 3/2004 | Dimitrova et al. ..... 375/240.16 |
| 6,731,684 B1 | * | 5/2004 | Wu ........................ 375/240.12 |
| 6,735,253 B1 | * | 5/2004 | Chang et al. .......... 375/240.16 |

OTHER PUBLICATIONS

Information Technology—Coding of Moving Pictures and Associated Audio for Digital Storage Media at up to about 1.5 Mbit/s—Part 2 Video, International Standards Organisation No. ISO/IEC 11172–2 (1993), pp. 37–38.

Information Technology—Generic Coding of Moving Pictures and Associated Audio Information—Part 2 Video International Standards Organisation No. ISO/IEC 13818–2 (1995), p. 85.

Fernando, W.A.C.; Canagarajah, C.N.; Bull, D.R. "Wipe Production in MPEG–2 Compressed Video," Image Processing, 2000. Proceedings. 2000 International Conference on Image Processing 2000, vol 2 pp. 303–306.

W.A.C. Fernando, C.N. Canagarajah, D.R. Bull "Video Special Effects Editing in MPEG–2 Compressed Video," IEEE Symposium on Circuits and Systems, (ISCAS) 2000, vol. 2 pp. 281–284.

W.A.C. Fernando, C.N. Canagarajah, D.R. Bull "Fade, Dissolve and Wipe Production in MPEG–2 Compressed Video" Consumer Electronics, 2000. ICCE. 2000, Digest of Technical Papers. International Conference 2000, pp. 322–323.

www.audiopix.com/3/index.asp.
www.duckware.com/slideshow/index.html.
http://service.real.com/help/library/guides/realslideshow/htmfiles/notice.htm.
www.krdl.org.sg/Investment/licensetech/ViSS.html.

* cited by examiner

Primary Examiner—Andy Rao
(74) Attorney, Agent, or Firm—Fay Kaplun & Marcin, LLP

(57) ABSTRACT

MPEG video compression is an efficient but complex video compression standard. Manipulation of MPEG video usually entails decoding, manipulating and recoding the video, but this is inefficient and causes degradation of the content. The present invention provides a range of transition effects to be generated without knowledge of the video material into which they are to be inserted. The synthesised transition pictures of the invention are inserted between two consecutive I- or P-pictures. Many effects are very efficiently constructed from a small number of explicitly coded macroblocks and a large number of skip blocks. Even for those effects where all of the macroblocks must be explicitly coded, this is done with very little information in each block. Accordingly, the invention allows fast and efficient processing and obviates the need to decode the MPEG to insert the transition and often requires no changes to the existing pictures.

11 Claims, 20 Drawing Sheets

|← Transition Frames →|

| I | B | B | B | B | B | B | B | B | B | B | B | P | B | B | P | B | B |
|---|---|---|---|---|---|---|---|---|---|---|---|---|---|---|---|---|---|
| 12 | 00 | 01 | 02 | 03 | 04 | 05 | 06 | 07 | 08 | 09 | 10 | 11 | 15 | 13 | 14 | 18 | 16 | 17 |

Figure 15

|← Transition Frames →|

| I | B | B | P | B | B | B | B | B | B | B | B | B | B | B | P | B | B |
|---|---|---|---|---|---|---|---|---|---|---|---|---|---|---|---|---|---|
| 02 | 00 | 01 | 15 | 03 | 04 | 05 | 06 | 07 | 08 | 09 | 10 | 11 | 12 | 13 | 14 | 18 | 16 | 17 |

Figure 16

|← Transition Frames →|

| I | B | B | P | B | B | P | B | B | B | B | B | B | B | B | B | B | P | B | B |
|---|---|---|---|---|---|---|---|---|---|---|---|---|---|---|---|---|---|---|---|
| 02 | 00 | 01 | 05 | 03 | 04 | 18 | 06 | 07 | 08 | 09 | 10 | 11 | 12 | 13 | 14 | 15 | 16 | 17 | 21 | 19 | 20 |

Figure 17

Creating MPEG video sequence with transitions

Creating MPEG video subsequences from video still frames

Creating MPEG video subsequence from Images

Creating MPEG video subsequences from an MPEG video

Multiplexing and packetising MPEG audio and video streams

TRANSITION TEMPLATES FOR COMPRESSED DIGITAL VIDEO AND METHOD OF GENERATING THE SAME

The present application claims priority under 35 U.S.C. § 119 to Australian Application No. PR1337 filed on Nov. 9, 2000, which is hereby incorporated by reference in its entirety for all purposes.

FIELD OF THE INVENTION

The present invention relates to transition templates for compressed digital video and methods of generating same, and in particular, to compactly representable transition pictures suitable for insertion in an MPEG video stream and a method of efficiently generating same.

The invention has been developed primarily for use with compressed MPEG video streams and will be described hereinafter with reference to this application. However, it will be appreciated that the invention is not limited to this particular field of use.

BACKGROUND

When displaying a series of pictures in video format, an aesthetically appealing way of moving from one picture to the next is achieved using "transition effects". Such transition effects take on a variety of forms and essentially describe any progressive replacement of a first picture by a second picture. A number of different types of transition effects are known, including but not limited to vertical wipes (in which "curtains" open or close from either side of the screen), double wipes (in which the "curtains" open or close from both sides of the screen simultaneously), horizontal wipes, diagonal wipes, squares closing in or out in a checkerboard style, radial wipes and the like.

An understanding of how such transition effects are achieved in the prior art requires a previous understanding of current analogue and digital video formats.

The usual model for analogue video follows the conventions of film based moving pictures, which is a series of still pictures. Digital video maintains this model, but often differs considerably in structure from analogue video. The movement away from the intuitive structure of a series of directly coded independent pictures has been motivated by the huge amounts of information associated with video. Most digital video standards seek to take advantage of spatial and temporal redundancy in the sequence of pictures to achieve significant data compression. There are two approaches to compressing video data, namely lossless and lossy. Lossless compression seeks to store the video content in exact form, whereas lossy compression further reduces the data required by representing only an approximation to the original video. This results in much higher compression and is done in such a way that the visual impact of the compression is minimised.

The widespread and increasing availability of digital video cameras for capturing high quality video, together with the ubiquity of software for viewing digital video and the stability of the content in digital form, makes digital video an attractive medium. However, the amount of data required to store digital video, even in compressed form, is an impediment for some applications. For these applications, it is imperative to use the most efficient forms of video coding, which will inevitably mean some form of lossy compression.

Among the most efficient forms of compression for coding digital video are the standards produced by the Motion Pictures Experts Group (MPEG). However, their efficiency is at the cost of complexity in their internal working. This complexity makes it difficult to manipulate the video in compressed form.

The re-encoding stage requires significant processing capabilities which are often beyond the capabilities of personal computers used in homes and small businesses.

Two of the MPEG standards are colloquially known as MPEG1 (MPEG1) and MPEG2 (MPEG2). These are described in detail in the International Standards Organisation documents which for MPEG1 are numbered ISO/IEC 11172-1 (1993) to ISO/IEC 11172-5 (1998) and for MPEG2 are numbered ISO/IEC 13818-1 (1995)-ISO/IEC 13818-10 (1999). The most important of these documents from the point of view of the embodiments of the current invention are the parts of the respective standards dealing with video coding. These consist of the document ISO/IEC 11172-2 (1993) entitled "Information Technology—Coding of Moving Pictures and Associated Audio for Digital Storage Media at up to about 1.5 Mbit/s: Part 2—Video", (MPEG1) and the document ISO/IEC 13818-2 (1995) entitled "Information Technology—Generic Coding of Moving Pictures and Associated Audio Information—Part 1 Systems: Part 2—Video" (MPEG2).

These MPEG standards are lossy video digital compression standards that are widely used. The following description relates to these techniques which, for simplicity, will be collectively referred to as MPEG, except where it is necessary to differentiate between the two standards. Much of what is described also relates to the new standard known as MPEG4 and it will be appreciated by those skilled in the art that the present invention may be readily adapted to work with that and other standards.

Because of the complexity of the MPEG format it is difficult to manipulate an MPEG video without first decoding it to a sequence of independently coded pictures. A disadvantage of this decoding step is that it produces a huge increase in the volume of data that has to be handled.

Because the MPEG compression scheme is lossy and not idempotent, a further disadvantage of the decoding and re-encoding step is that it causes degradation of the original content.

The current method of generating an MPEG transition involves decoding the sequence, inserting pictures for the transition and then recoding the sequence. One disadvantage of this method is that it is inefficient. Another disadvantage is that the recoding step degrades the sequence of pictures that are recoded.

A further disadvantage of current methods of generating transitions is that such effects can only be generated by referring to particular video sequences. For this reason, such transitions cannot be re-used unmodified for insertion into any video sequence, but must be individually generated every time a transition is required.

The above discussion of the existing art is intended to assist the addressee in understanding the invention that is described below and should not be taken as an indication of the extent of the common general knowledge of a person skilled in the art.

DISCLOSURE OF THE INVENTION

It is an object of the present invention to overcome or ameliorate at least one of the disadvantages of the prior art, or to provide a useful alternative.

It is another object of the present invention to provide transition templates for compressed digital video and a method of generating such templates which will overcome or substantially ameliorate at least some of these deficiencies of the prior art.

An advantage of the preferred embodiment of the invention is that it allows the digital video to be manipulated in compressed form.

A further advantage of the preferred embodiment of the invention is that it produces compactly representable transition effects, which can be inserted into the compressed MPEG video with minimal manipulation, and therefore minimal degradation, of the existing video.

An additional advantage of the preferred embodiment is that such transition effects can be achieved using standard personal computers. This is because there is no need to recode the whole initial sequence; the pre-encoded transition template pictures are simply inserted into the encoded data stream.

An additional advantage of the preferred embodiment of the invention is that it provides an efficient method of creating an MPEG slideshow using a particular type of transition template.

A further advantage of the preferred embodiment of the invention is to provide a method of generating a transition effect template without reference to any video sequence. Such a template can be re-used by inserting it into any compressed video data stream.

According to a first aspect of the present invention there is provided a wipe transition template suitable for insertion between a past reference picture and a future reference picture in a compressed digital data stream, the template including:

a series of transition pictures including a first transition picture and a last transition picture wherein each transition picture includes a series of rows of macroblocks, each row including a first macroblock and a last macroblock; and wherein the majority of the macroblocks are either:

past copy macroblocks (PCMs) which copy a corresponding macroblock in the past reference picture;

future copy macroblocks (FCMs) which copy a corresponding macroblock in the future reference picture; or merge macroblock (MMs) which average the corresponding macroblocks from the past and future reference pictures.

Preferably, the pictures in the wipe transition are constructed from some PCMs and some FCMs. More preferably, the first transition picture is predominantly constructed from PCMs and in subsequent pictures the PCMs are progressively replaced by FCMs. Preferably the regions of PCMs are contiguous and the regions of FCMs are contiguous. More preferably, in successive pictures, macroblocks along the boundary between the contiguous regions of PCMs and FCMs are converted from PCMs to FCMs. Alternatively, for some of the transition pictures at least some of the PCMs may be replaced in subsequent pictures by MMs and in later transition pictures those MMs will be replaced by FCMs.

Alternatively, in this first aspect of the invention, each wipe transition picture may contain only PCMs or only FCMs so each picture in the transition effectively copies either the past reference picture or the future reference picture to produce a Hold Transition. This Hold Transition simply holds the picture unchanged for some multiple of the normal picture time. Preferably the transition consists of zero or more copies of the past reference picture followed by zero or more copies of the future reference picture.

Preferably, the past reference picture and the future reference picture are intra coded (I) pictures. More preferably, the past reference picture and future reference picture are sequential slides in a slideshow.

Preferably, the transition pictures are either B or P pictures. More preferably, the transition pictures are encoded in the order PBBPBBPBBP.

Preferably, if the series of transition pictures is more than 200 pictures long, the series includes additional I pictures which copy the past reference picture.

Preferably, in any wipe transition two or more of the repeated macroblocks in any run of identical macroblocks (in normal MPEG row-column order) within a picture are replaced by a single Macroblock of the same type with subsequent macroblocks of that type in that run omitted or skipped. Any MPEG compliant decoder, when it discovers that these macroblocks are skipped, will generate an appropriate number of copies of the last coded macroblock. For MPEG2 compatibility, these runs are restricted to a single horizontal row in a single picture, and the last macroblock on a row is not skipped, even if it is the same as previous macroblocks in the row.

According to a second aspect of the present invention there is provided a slide-out transition template suitable for insertion between a past reference picture and a future reference picture in a compressed digital data stream, the template including:

a series of transition pictures including a first transition picture and a last transition picture wherein each transition picture includes a series of rows of macroblocks, each row including a first macroblock and a last macroblock; and wherein a majority of the macroblocks is either:

an offset copy macroblock which references the past reference picture (POCM); or a future copy macroblock which references the future reference picture (FCM).

Preferably, the POCMs are macroblocks which include non-zero motion vector information. More preferably, the POCMs are macroblocks which do not include discrete cosine transformation (DCT) residual information.

Preferably, the pictures in the slide-out transition are constructed initially with some POCMs and some FCMs. More preferably, the first transition picture is predominantly constructed from POCMs and in subsequent pictures the POCMs are progressively replaced by FCMs. Preferably, the boundary between the POCMs and FOCMs forms some geometric pattern in the picture and the POCMs are contiguous within the picture, and the FCMs are contiguous over the rest of the picture. Preferably macroblocks which change from POCMs to FCMs from one picture to a subsequent picture are chosen to give the impression that the old picture is sliding out to reveal the new picture.

Preferably the motion vectors of all the POCMs in the picture are the same and are either horizontal, vertical or at some oblique angle. Alternatively the POCMs form several contiguous regions in the picture in each contiguous part of which the motion vectors are the same, but so that the several regions have different motion vectors chosen such that these regions move so as to eventually reveal in the final picture of the transition the complete new picture.

Preferably, in any slide-out transition two or more of the repeated macroblocks in any run of identical macroblocks (in normal MPEG row-column order) within a picture are replaced by a single Macroblock of the same type with subsequent macroblocks of that type in that run omitted or skipped. Any MPEG compliant decoder, when it discovers that these macroblocks are skipped, generates an appropriate number of copies of the last coded macroblock. For MPEG2 compatibility, these runs are restricted to a single horizontal row in a single picture, and the last macroblock on a row is not skipped, even if it is the same as previous macroblocks in the row.

According to a third aspect of the present invention there is provided a slide-in transition template suitable for insertion between a past reference picture and a future reference picture in a compressed digital data stream, the template including:

a series of transition pictures including a first transition picture and a last transition picture wherein each transition picture includes a series of rows of macroblocks, each row including a first macroblock and a last macroblock; and wherein a majority of the macroblocks is either:

a past copy macroblock which references the past reference picture (PCM); or an offset copy macroblock which references the future reference picture (FOCM).

Preferably, the FOCMs are macroblocks which include non-zero motion vector information. More preferably, the FOCMs are macroblocks which do not include discrete cosine transformation (DCT) residual information.

Preferably, the pictures in the slide-out transition are constructed initially with some FOCMs and some PCMs. More preferably, the first transition picture is predominantly constructed from PCMs and in subsequent pictures the PCMs are progressively replaced by FOCMs. Preferably, the boundary between the PCMs and FOCMs form some geometric boundary in the picture and the FOCMs are contiguous within the picture, and the PCMs are contiguous over the rest of the picture. Preferably macroblocks which change from PCMs to FOCMs from one picture to a subsequent picture are chosen to give the impression that the old picture is sliding out to reveal the new picture.

Preferably the motion vectors of all the FOCMs in a picture are the same and are either horizontal, vertical or at some oblique angle. Alternatively the FOCMs form several contiguous regions in the picture in each contiguous part of which the motion vectors are the same, but so that the several regions have different motion vectors chosen such that the contiguous parts come together in the final picture of the transition to form the complete new picture.

Preferably, in any slide-in transition two or more of the repeated macroblocks in any run of identical macroblocks (in normal MPEG row-column order) within a picture are replaced by a single Macroblock of the same type with subsequent macroblocks of that type in that run omitted or skipped. Any MPEG compliant decoder, when it discovers that these macroblocks are skipped, generates an appropriate number of copies of the last coded macroblock. For MPEG2 compatibility, these runs are restricted to a single horizontal row in a single picture, and the last macroblock on a row is not skipped, even if it is the same as previous macroblocks in the row.

According to a fourth aspect of the present invention there is provided a push transition template suitable for insertion between a past reference picture and a future reference picture in a compressed digital data stream, the template including:

a series of transition pictures including a first transition picture and a last transition picture wherein each transition picture includes a series of rows of macroblocks, each row including a first macroblock and a last macroblock; and wherein a majority of the macroblocks is either:

an offset copy macroblock which references the past reference picture (POCM); or an offset copy macroblock which references the future reference picture (FOCM).

Preferably, the POCMs and FOCMs are macroblocks which include non-zero motion vector information. More preferably, the POCMs and FOCMs are macroblocks which do not include discrete cosine transformation (DCT) residual information.

Preferably, the pictures in the push transition are constructed initially with some POCMs and some FOCMs. More preferably, the first transition picture are predominantly constructed from POCMs and in subsequent pictures the POCMs are progressively replaced by FOCMs.

Preferably, the boundary between the POCM's and FOCM's form some geometric pattern in the picture and the POCM's are contiguous within the picture, and the FOCMs are contiguous over the rest of the picture. Preferably macroblocks which change from POCMs to FOCMs from one picture to a subsequent picture are chosen to give the impression that the new picture is sliding in and pushing out the old picture.

Preferably the motion vectors of all the OCMs in a picture are the same and are either horizontal, vertical or at some oblique angle. Alternatively the OCMs form several contiguous regions in the picture in each contiguous part of which the motion vectors are the same, but so that the several regions have different motion vectors chosen such that the contiguous parts come together in the final picture of the transition to form the complete new picture.

Preferably, in any push transition two or more of the repeated macroblocks in any run of identical macroblocks (in normal MPEG row-column order) within a picture are replaced by a single Macroblock of the same type with subsequent macroblocks of that type in that run omitted or skipped. Any MPEG compliant decoder, when it discovers that these macroblocks are skipped, generates an appropriate number of copies of the last coded macroblock. For MPEG2 compatibility, these runs are restricted to a single horizontal row in a single picture, and the last macroblock on a row is not skipped, even if it is the same as previous macroblocks in the row.

According to a fifth aspect of the present invention there is provided a fade out transition template suitable for insertion after a past reference picture in a compressed digital data stream, the template including:

a series of transition pictures including a first transition picture and a last transition picture wherein each transition picture includes a series of rows of macroblocks, each row including a first macroblock and a last macroblock; and wherein a majority of the macroblocks are past fading macroblocks (PFMs) which reference the past reference picture and add a non-zero intensity offset to increase or decrease its intensity.

Preferably, the PFMs are macroblocks having a zero motion vector. More preferably the PFMs include non-zero values for one or more of the block DCT residual components with zero horizontal and vertical frequency (the DC components). More preferably, the DCT residual components with non-zero frequency (the AC components) have a value of zero.

Preferably all of the pictures of the transition are P-pictures so that each successive picture references the previous picture and each block is the same with residual information which compounds from one picture to the next.

Preferably, as the series of transition pictures progresses from the first transition picture to the last transition picture, the intensity of the images generated by the PFMs change in an incremental manner as the intensity offsets compound. Preferably, for improved efficiency, a single B picture, consisting entirely of Merge Macroblocks, is inserted between successive P pictures, resulting in a picture which averages the immediately preceding and the immediately following P picture. Preferably, in the said B-pictures, any repeat MMs are skipped. Preferably, as the series of transition pictures progresses the intensity of the pictures decrease to black. Alternatively, as the series of transition pictures progresses the intensity of the pictures increase to white.

Alternatively all of the pictures in the transition are B pictures, in which all of the PFMs reference the original picture and no compounding of the DCT residuals is possible. In this case the PFMs have a value of the DCT residual component equal to the desired offset for the picture.

According to a sixth aspect of the present invention there is provided a fade in transition template suitable for insertion before a future reference picture in a compressed digital data stream, the template including:

a series of transition pictures including a first transition picture and a last transition picture wherein each transition picture includes a series of rows of macroblocks, each row including a first macroblock and a last macroblock; and wherein a majority of the macroblocks are future fading macroblocks (FFMs) which reference the future reference picture and add a non-zero intensity offset to increase or decrease its intensity.

Preferably, the FFMs are macroblocks having a zero motion vector. More preferably the FFMs include non-zero values for one or more of the block DCT residual components with zero horizontal and vertical frequency (the DC components). More preferably, the DCT residual components with non-zero frequency (the AC components) will have a value of zero.

Preferably all of the pictures of the transition are B-pictures so that each successive picture references the same original picture. Preferably, as the series of transition pictures progresses from the first transition picture to the last transition picture, the intensity of the image generated from the FFMs change in an incremental manner as a result of changes to the DCT residual component. Preferably, as the series of transition pictures progresses the intensity of the FFMs increase from black to gradually match the intensity of the macroblocks in the future reference picture. Alternatively, as the series of transition pictures progresses the intensity of the FFMs decrease from white to gradually match the intensity of the macroblocks in the future reference picture.

According to a seventh aspect of the present invention there is provided a compound transition template suitable for insertion between a past reference picture and a future reference picture in a compressed digital data stream, the template including:

a first series of transition pictures and a second series of transition pictures wherein the first series of transition pictures is one or more of:

(a) a wipe transition template;
(b) hold transition template;
(c) a slide-in transition template;
(d) a slide-out transition template;
(e) a push transition template;
(f) a fade-in transition template;
(g) a fade-out transition template; or
(h) a compound transition template;

and wherein the second series of transition pictures is one or more of:

(a) a wipe transition template;
(b) hold transition template;
(c) a slide-in transition template;
(d) a slide-out transition template;
(e) a push transition template;
(f) a fade-in transition template or
(g) a fade-out transition template, such that the two series of transition pictures form a compound transition template.

According to an eighth aspect of the present invention there is provided a method of generating a wipe transition template suitable for insertion between a past reference picture and a future reference picture in a compressed digital data stream, the method including the steps of:

generating a series of transition pictures including a first transition picture and a last transition picture wherein each transition picture includes a series of rows of macroblocks, each row including a first macroblock and a last macroblock; and dividing the macroblocks in each picture into contiguous subregions;

designating most of the macroblocks within each contiguous subregions as Past Copy Macroblocks (PCM's) or Future Copy Macroblocks (FCMs); and designating a boundary between any PCM subregion and a neighbouring FCM subregion as part of a wipe transition boundary;

designating each of the macroblocks in the first transition picture as PCMs;

for each new transition picture:

copying a previous transition picture to form the new synthesised picture changing some of the PCMs in the new transition picture to FCMs so as to change the position of the wipe boundary; and continuing to copy and change pictures until the most recently created transition picture consists entirely of FCMs.

Preferably, the step of changing some of the PCMs to FCMs includes a step of selecting the PCMs to change so that the wipe boundary is changed in an incremental manner.

More preferably, the method includes the step of changing the PCMs to FCMs in an incremental manner.

Preferably, the method includes the steps of:

changing the PCMs to MMs; and then in a later picture changing the MMs to FCMs.

Preferably the MMs in any transition picture fall in one or more contiguous regions. More preferably all of the PCMs are incrementally converted to MMs over a sequence of transition picture, then all of the MMs are converted to FCMs over a further series of frames. More preferably the boundary between the MMs and FCMs form a second wipe boundary.

Preferably, the method further includes the steps of:

identifying any sequences of two or more of the same macroblock (in normal row column order) in any single transition picture (not including the last macroblock on a row);

replacing such sequences by a single macroblock of the same type and skipping the remaining macroblocks in that run.

Alternatively in the step of designating the macroblocks as PCMs or FCMs, the method includes the step of designating all of the macroblocks of a first set of transition pictures in a wipe transition template as entirely PCMs and for the next picture in the transition template and for all subsequent pictures converting all of the PCMs to FCMs so that the first set of transition pictures exactly copy the past reference picture and the last set of transition pictures exactly copy the future reference picture. This version of the wipe transition template is known as a hold transition template.

The hold transition template may be used to construct a slideshow. Preferably, in constructing a slideshow, the method includes the step of selecting an intra coded (I) picture as the past reference picture. More preferably, the method includes the step of selecting a slide in a slideshow as the past reference picture.

Preferably, when constructing a slideshow, the method includes the step of designating the transition pictures as either B or P pictures. More preferably, the method includes the step of encoding the transition pictures in the order BBPBBPBB.

Preferably, when constructing a hold transition template, if the series of transition pictures is more than 200 pictures long, the method includes the step of adding to the series of transition pictures an additional I picture which copies the past reference picture.

According to a ninth aspect of the present invention there is provided a method of generating a slide-out transition template suitable for insertion between a past reference picture and a future reference picture in a compressed digital data stream, the method including the steps of:

generating a series of transition pictures including a first transition picture and a last transition picture wherein each transition picture includes a series of rows of macroblocks, each row including a first macroblock and a last macroblock; and designating a majority of the macroblocks as either:

offset copy macroblocks (OCMs) which references the past reference picture (POCMs); or future copy macroblocks (FCMs) which references the future reference picture;

Preferably, the step of designating the macroblocks as OCMs includes the step of designating the macroblocks to include non-zero motion vector information. More preferably, the step of designating the macroblocks as OCMs includes the step of designating the macroblocks to not include direct cosine transformation (DCT) residual information.

Preferably, the method further includes the step of generating a slide-out template boundary in at least some of the transition pictures, the boundary having a position such that it divides the FCMs from the POCMs. More preferably, the step of generating the boundary includes the step of determining some geometric pattern which the boundary will follow in the picture. More preferably this geometric pattern is chosen such that the POCMs are contiguous within the picture, and the FCMs are contiguous over the rest of the picture.

Preferably, the method includes a step in which some of the POCMs in one transition picture are changed to FCMs in the next transition picture. More preferably, the POCMs chosen to be changed are chosen so as to change the position of the boundary in the next picture in an incremental manner. More preferably these POCMs are chosen to give the impression that the new picture is sliding out to reveal the new picture as the transition progresses from the first picture to the last picture.

Preferably, the method includes a step of setting the motion vectors for each of the POCMs in the transition. More preferably, this step includes the step of setting the motion vectors of all the POCMs in a given picture to the same vector value which may be either horizontal, vertical or at some oblique angle. Alternatively, the method includes the step of dividing the POCMs in a given picture into several contiguous subregions such that in each contiguous subregion the motion vectors in a subregion are set to the same vector value. Preferably, the motion vectors in each of the separate subregions of a single picture are chosen such that these subregions appear to move from one picture to the next so that they converge to make, in the final picture of the transition, the complete new picture.

Preferably, the method includes the steps of:

dividing the macroblocks in each picture into contiguous subregions;

designating the macroblocks within each contiguous sub-regions as POCM's or FCMs; and designating the boundary between any POCM subregion and a neighbouring FCM subregion as part of the slide-out transition boundary;

designating each of the macroblocks in the first transition picture as POCMs;

for each new transition picture:

copying a previous transition picture to form the new synthesised picture changing some of the POCMs in the new transition picture to FCMs so as to change the position of the slide-out boundary; and continuing to copy and change pictures until the most recently created new transition picture consists entirely of FCMs.

Preferably, the step of changing some of the POCMs to FCMs includes a step of selecting the POCMs to change so that the slide out boundary is changed in an incremental manner.

Preferably, the method further includes the steps of:

identifying any sequences of two or more of the same macroblock (in normal row column order) in any single transition picture (not including the last macroblock on a row);

replacing such sequences by a single macroblock of the same type and skipping the remaining macroblocks in that run.

According to a tenth aspect of the present invention there is provided a method of generating a slide-in transition template suitable for insertion between a past reference picture and a future reference picture in a compressed digital data stream, the method including the steps of:

generating a series of transition pictures including a first transition picture and a last transition picture wherein each transition picture includes a series of rows of macroblocks, each row including a first macroblock and a last macroblock; and designating a majority of the macroblocks as either:

past copy macroblocks (PCMs) which references the past reference picture; or offset copy macroblocks (OCMs) which references the future reference picture (FOCMs).

Preferably, the step of designating the macroblocks as OCMs includes the step of designating the macroblocks to include non-zero motion vector information. More preferably, the step of designating the macroblocks as OCMs includes the step of designating the macroblocks to not include direct cosine transformation (DCT) residual information.

Preferably, the method further includes the step of generating a slide-out template boundary in at least some of the transition pictures, the boundary having a position such that it divides the FOCMs from the PCMs. More preferably, the step of generating the boundary includes the step of determining some geometric pattern which the boundary follows in the picture. More preferably this geometric pattern is chosen such that the FOCMs are contiguous within the picture, and the PCMs are contiguous over the rest of the picture.

Preferably, the method includes a step in which some of the PCMs in one transition picture are changed to FOCMs in the next transition picture. More preferably, the PCMs chosen to be changed are chosen so as to change the position of the boundary in the next picture in an incremental manner. More preferably these PCMs are chosen to give the impression that the new picture is sliding in to cover the old picture as the transition progresses from the first picture to the last picture.

Preferably, the method includes a step of setting the motion vectors for each of the FOCMs in the transition. More preferably, this step includes the step of setting the motion vectors of all the FOCMs in a given picture to the same vector value which may be horizontal, vertical or at some oblique angle. Alternatively, the method includes the step of dividing the FOCMs in a given picture into several contiguous subregions such that in each contiguous subregion the motion vectors in a subregion are set to the same vector value. Preferably, the motion vectors in each of the separate subregions of a single picture are chosen such that these subregions appear to move from picture to picture so as to converge to make, in the final picture of the transition, the complete new picture.

Preferably, the method includes the step of:

dividing the macroblocks in each picture into contiguous subregions;

designating the macroblocks within each contiguous subregions as FOCM's or PCMs; and designating a boundary between any FOCM subregion and a neighbouring PCM subregion as part of a slide-in transition boundary;

designating each of the macroblocks in the first transition picture as PCMs;

for each new transition picture:

copying a previous transition picture to form the new transition picture;

changing some of the PCMs in the new transition picture to FOCMs so as to change the position of the slide-out boundary; and continuing to copy and change pictures until the most recently created new transition picture consists entirely of FOCMs. Preferably, the step of changing some of the PCMs to FOCMs includes a step of selecting the PCMs to be changed so that the slide out boundary is changed in an incremental manner.

Preferably, the method further includes the steps of:

identifying any sequences of two or more of the same macroblock (in normal row column order) in any single transition picture (not including the last macroblock on a row);

replacing such sequences by a single macroblock of the same type and skipping the remaining macroblocks in that run.

According to an eleventh aspect of the present invention there is provided a method of generating a push transition template suitable for insertion between a past reference picture and a future reference picture in a compressed digital data stream, the method including the steps of:

generating a series of transition pictures including a first transition picture and a last transition picture wherein each transition picture includes a series of rows of macroblocks, each row including a first macroblock and a last macroblock; and designating a majority of the macroblocks as either:

offset copy macroblocks (OCMs) which references the past reference picture (POCMs); or offset copy macroblocks (OCMs) which references the future reference picture (FOCMs).

Preferably, the step of designating the macroblocks as OCMs includes the step of designating the macroblocks to include non-zero motion vector information. More preferably, the step of designating the macroblocks as OCMs includes the step of designating the macroblocks to not include direct cosine transformation (DCT) residual information.

Preferably, the method further includes the step of generating a push template boundary in at least some of the transition pictures, the boundary having a position such that it divides the FOCMs from the POCMs. More preferably, the step of generating the boundary includes the step of determining some geometric pattern which the boundary will follow in the picture. More preferably this geometric pattern is chosen such that the FOCMs are contiguous within the picture, and the POCMs are contiguous over the rest of the picture.

Preferably, the method includes a step in which some of the POCMs in one transition picture are changed to FOCMs in the next transition picture. More preferably, the POCMs chosen to be changed are chosen so as to change the position of the boundary in the next picture in an incremental manner. More preferably these POCMs are chosen to give the impression that the new picture is pushing out the old picture as the transition progresses from the first picture to the last picture.

Preferably, the method includes a step of setting the motion vectors for each of the OCMs in the transition. More preferably, this step includes the step of setting the motion vectors of all the FOCMs in a given picture to the same vector value which may be horizontal or vertical or at some oblique angle and all the POCMs in the same picture to another vector value which may be horizontal or vertical or at some oblique angle. Alternatively, the method includes the step of dividing the POCMs and FOCMs in a given picture into several contiguous subregions consisting entirely of POCMs or FOCMs such that in each contiguous subregion the motion vectors in a subregion are set to the same vector value. Preferably, the motion vectors in each of the separate subregions of a single picture are chosen such that these subregions appear to move from picture to picture so as to make, in the final picture of the transition, the complete new picture.

Preferably, the method includes the step of:

dividing the macroblocks in each picture into contiguous subregions;

designating the macroblocks within each contiguous subregions as FOCM's or POCMs; and designating the boundary between any FOCM subregion and a neighbouring POCM subregion as part of the push transition boundary;

designating each of the macroblocks in the first transition picture as POCMs;

for each new transition picture:

copying a previous transition picture to form the new transition picture changing some of the POCMs in the new transition picture to FOCMs so as to change the position of the slide-out boundary; and continuing to copy and change pictures until the most recently created new transition picture consists entirely of FOCMs.

Preferably, the step of changing some of the POCMs to FOCMs includes a step of selecting the POCMs to be changed so that the push boundary is changed in an incremental manner.

Preferably, the method further includes the steps of:

identifying any sequences of two or more of the same macroblock (in normal row column order) in any single transition picture (not including the last macroblock on a row);

replacing such sequences by a single macroblock of the same type and skipping the remaining macroblocks in that run.

According to a twelfth aspect of the present invention there is provided a method of generating a fade out transition template suitable for insertion after a past reference picture in a compressed digital data stream, the method including the steps of:

generating a series of transition pictures including a first transition picture and a last transition picture wherein each transition picture includes a series of rows of macroblocks, each row including a first macroblock and a last macroblock; and designating a majority of the macroblocks as past fading macroblocks (PFMs) which reference the past reference picture and add a non zero intensity offset to increase or decrease its intensity.

Preferably, the step of designating the macroblocks as PFMs includes the step of designating the macroblocks to have a zero motion vector. More preferably the step of designating the macroblocks as PFMs includes the step of designating the PFMs to include non-zero values for one or more of the block DCT residual components with zero horizontal and vertical frequency (the DC components), and zero values for the DCT residual components with non-zero frequency (the AC components).

Preferably, the method further includes the step of designating each of the pictures in the transition as P-pictures so that each picture in the transition references the previous picture and any intensity changes accumulate from picture to picture. Preferably, for improved efficiency, the method further includes the step of inserting a single B picture, consisting entirely of Merge Macroblocks, between successive P pictures, resulting in a picture which averages the immediately preceding and the immediately following P picture. Preferably, in the said B-pictures, the method further includes the step of skipping any repeated MMs.

Alternatively, the method further includes the step of designating each of the pictures in the transition as B-pictures consisting entirely of PFMs so that each picture in the transition references the original sequence reference picture immediately preceding the transition and any intensity changes from picture to picture are explicity coded in the DCT components of each PFM.

Preferably, the method further includes the step of setting the DCT residual components of the intensity blocks of the PFMs so that the intensity of the decoded macroblocks changes in an incremental manner as the series of transition pictures progresses from the first transition picture to the last transition picture. Preferably, the method includes the step of decreasing the intensity of the PFMs to black as the series of transition pictures progresses. Alternatively, the method includes the step of increasing the intensity of the PFMs to white as the series of transition pictures progresses.

According to a thirteenth aspect of the present invention there is provided a method of generating a fade in transition template suitable for insertion before a future reference picture in a compressed digital data stream, the method including the steps of:

generating a series of transition pictures including a first transition picture and a last transition picture wherein each transition picture includes a series of rows of macroblocks, each row including a first macroblock and a last macroblock; and designating a majority of the macroblocks as future fading macroblocks (FFMs) which reference the future reference picture and add a non zero intensity offset to increase or decrease its intensity.

Preferably, the step of designating the macroblocks as FFMs includes the step of designating the macroblocks to include a zero motion vector. More preferably the step of designating the macroblocks as FFMs includes the step of designating the FFMs to include non-zero values for one or more of the block DCT residual components with zero horizontal and vertical frequency (the DC components), and zero values for the DCT residual components with non-zero frequency (the AC components).

Preferably, the method further includes the step of designating each of the pictures in the transition as B-pictures consisting entirely of FFMs so that each FFM in the transition references the original sequence reference picture immediately following the transition and any intensity changes from picture to picture are explicity coded in the DCT components of each FFM.

Preferably, the method includes the step of changing the intensity of the FFMs in an incremental manner as the series of transition pictures progresses from the first transition picture to the last transition picture. Preferably, the method includes the step of increasing the intensity of the FFMs from black to gradually match the intensity of the macroblocks in the future reference picture as the series of transition pictures progresses. Alternatively, the method includes the step of decreasing the intensity of the FFMs from white to gradually match the intensity of the macroblocks in the future reference picture as the series of transition pictures progresses.

According to a fourteenth aspect of the present invention there is provided a method of generating a compound transition template suitable for insertion between a past reference picture and a future reference picture in a compressed digital data stream, the method including the steps of:

generating or selecting one of:
(a) a wipe transition template;
(b) a hold transition template;
(c) a slide-in transition template;
(d) a slide-out transition template;
(e) a push transition template;
(f) a fade in transition template;
(g) a fade out transition template or
(h) a compound transition template
as a first series of transition pictures;
generating or selecting one of:
(a) a wipe transition template;

(b) a hold transition template
(c) a slide-in transition template
(d) a slide-out transition template;
(e) a push transition template
(f) a fade in transition template; or
(g) a fade out transition template
as a second series of transition pictures; and
concatenating the first series of transition pictures with the second series of transition pictures to form a compound transition template.

According to a fifteenth aspect of the present invention there is provided a method of inserting a transition template between a past reference picture and a future reference picture in a compressed digital data stream, the method including the steps of:
receiving the compressed digital data stream;
identifying the past reference picture and the future reference picture;
selecting the transition template; and
inserting the template between the past reference picture and the future reference picture in the compressed digital data stream whilst a substantial proportion of the data stream remains in compressed form.

Preferably, the transition template is one or more of:
(a) a wipe transition template;
(b) a hold transition template;
(c) a slide-in transition template;
(d) a slide-out transition template;
(e) a push transition template;
(f) a fade in transition template;
(g) a fade out transition template; or
(h) a compound transition template.

Preferably, the step of selecting the transition template is preceded by the step of generating the transition template.

According to a sixteenth aspect of the present invention there is provided a method of inserting a transition template after a past reference picture in a compressed digital data stream, the method including the steps of:
receiving the compressed digital data stream;
identifying the past reference picture;
selecting the transition template; and
inserting the template after the past reference picture in the compressed digital data stream whilst a substantial proportion of the data stream remains in compressed form.

Preferably, the transition template is one or more of:
(a) a fade out transition template; or
(b) a hold transition template.

Preferably, the step of selecting the transition template is preceded by the step of generating the transition template.

According to a seventeenth aspect of the present invention there is provided a method of inserting a transition template before a future reference picture in a compressed digital data stream, the method including the steps of:
receiving the compressed digital data stream;
identifying the future reference picture;
selecting the transition template; and
inserting the template before the future reference picture in the compressed digital data stream whilst a substantial proportion of the data stream remains in compressed form.

Preferably, the transition template is a fade in transition template or a hold transition template.

According to an eighteenth aspect of the present invention there is provided a compressed digital data stream including:
a past reference picture;
a future reference picture; and
a transition template inserted between the two reference pictures.

Preferably, the transition template is one or more of:
(a) a wipe transition template;
(b) a hold transition template;
(c) a slide-in transition template;
(d) a slide-out transition template;
(e) a push transition template;
(f) a fade in transition template;
(g) a fade out transition template; or
(h) a compound transition template.

According to a nineteenth aspect of the present invention there is provided a compressed digital data stream including:
a past reference picture; and
a transition template inserted after the past reference picture.

Preferably, the transition template is one or more of:
(a) a fade out transition template; or
(b) a hold transition template.

According to a twentieth aspect of the present invention there is provided a compressed digital data stream including:
a future reference picture; and
a transition template inserted before the future reference picture.

Preferably, the transition template is a fade in transition template or a hold transition template.

According to a twenty-first aspect of the present invention there is provided a transition template suitable for insertion between a past reference picture and a future reference picture in a compressed digital data stream, the template including:
a series of transition pictures wherein each transition picture includes a series of rows of macroblocks, each row including a first macroblock and a last macroblock;
wherein at least some of the macroblocks are pre-defined transition macroblocks; and
wherein said pre-defined transition macroblocks are arranged in said transition pictures so as to give the impression that the future reference picture is incrementally replacing the past reference picture.

Preferably, said pre-defined transition macroblocks include one or more of:
(a) past copy macroblocks (PCMs) which copy a corresponding macroblock in the past reference picture;
(b) future copy macroblocks (FCMs) which copy a corresponding macroblock in the future reference picture;
(c) merge macroblock (MMs) which average the corresponding macroblocks from the past and future reference pictures;
(d) offset copy macroblocks which references the past reference picture (POCM);
(e) offset copy macroblocks which references the future reference picture (FOCM)
(f) future fading macroblocks (FFMs) which reference the future reference picture and add a non-zero intensity offset to increase or decrease its intensity; or
(g) past fading macroblocks (PFMs) which reference the past reference picture and add a non-zero intensity offset to increase or decrease its intensity.

According to a twenty-second aspect of the present invention there is provided a method of generating a transition template suitable for insertion between a past reference picture and a future reference picture in a compressed digital data stream, the method including the steps of:
generating a series of transition pictures including a first transition picture and a last transition picture wherein each transition picture includes a series of rows of macroblocks, each row including a first macroblock and a last macroblock; and designating at least some of the macroblocks within each transition picture as either first predefined transition macroblocks or second predefined transition macroblocks; and designating a boundary between any first predefined transition macroblocks and neighbouring second predefined transition macroblocks as part of a transition boundary;

designating all or almost all of the macroblocks in the first transition picture as first predefined transition macroblocks;

for each new transition picture:

copying a previous transition picture to form the next synthesised picture;

changing some of the first predefined transition macroblocks in the new transition picture to second predefined transition macroblocks so as to change the position of the transition boundary; and continuing to copy and change pictures until the most recently created transition picture consists entirely or almost entirely of second predefined transition macroblocks.

Preferably, said first pre-defined transition macroblocks include one or more of:

(a) past copy macroblocks (PCMs) which copy a corresponding macroblock in the past reference picture;

(b) future copy macroblocks (FCMs) which copy a corresponding macroblock in the future reference picture;

(c) merge macroblock (MMs) which average the corresponding macroblocks from the past and future reference pictures;

(d) offset copy macroblocks which references the past reference picture (POCM);

(e) offset copy macroblocks which references the future reference picture (FOCM)

(f) future fading macroblocks (FFMs) which reference the future reference picture and add a non-zero intensity offset to increase or decrease its intensity; or (g) past fading macroblocks (PFMs) which reference the past reference picture and add a non-zero intensity offset to increase or decrease its intensity.

Preferably, said second pre-defined transition macroblocks include one or more of:

(a) past copy macroblocks (PCMs) which copy a corresponding macroblock in the past reference picture;

(b) future copy macroblocks (FCMs) which copy a corresponding macroblock in the future reference picture;

(c) merge macroblock (MMs) which average the corresponding macroblocks from the past and future reference pictures;

(d) offset copy macroblocks which references the past reference picture (POCM);

(e) offset copy macroblocks which references the future reference picture (POCM)

(f) future fading macroblocks (FFMs) which reference the future reference picture and add a non-zero intensity offset to increase or decrease its intensity; or (g) past fading macroblocks (PFMs) which reference the past reference picture and add a non-zero intensity offset to increase or decrease its intensity.

According to a twenty-third aspect of the present invention there is provided a method of generating a transition template suitable for insertion between a past reference picture and a future reference picture in a compressed digital data stream, the method including the steps of:

generating a series of transition pictures including a first transition picture and a last transition picture wherein each transition picture includes a series of rows of macroblocks, each row including a first macroblock and a last macroblock; and dividing the macroblocks in each picture into contiguous subregions;

designating at least some of the macroblocks within each contiguous subregions as either first predefined transition macroblocks or second predefined transition macroblocks; and designating a boundary between any first macroblock subregion and a neighbouring second macroblock subregion as part of a transition boundary;

designating each of the macroblocks in the first transition picture as first predefined transition macroblocks;

for each new transition picture:

copying a previous transition picture to form the new synthesised picture changing some of the first predefined transition macroblocks in the new transition picture to second predefined transition macroblocks so as to change the position of the transition boundary; and continuing to copy and change pictures until the most recently created transition picture consists entirely of second predefined transition macroblocks.

BRIEF DESCRIPTION OF THE DRAWINGS

Preferred embodiments of the invention will now be described, by way of example only, with reference to the accompanying drawings in which:

FIG. 15 is a block diagram of a Group of Pictures (GOP) showing a set of transition pictures inserted between the last P-picture of the previous GOP and the I-picture of the current GOP according to the method of the present invention;

FIG. 16 is a block diagram of a Group of Pictures (GOP) showing a set of transition pictures inserted between the first I-picture in the GOP and first P-picture in the GOP according to the method of the present invention;

FIG. 17 is a block diagram of a Group of Pictures (GOP) showing a set of transition pictures inserted between consecutive P-pictures according to the method of present invention;

DESCRIPTION OF THE PREFERRED EMBODIMENTS

Figure 1:
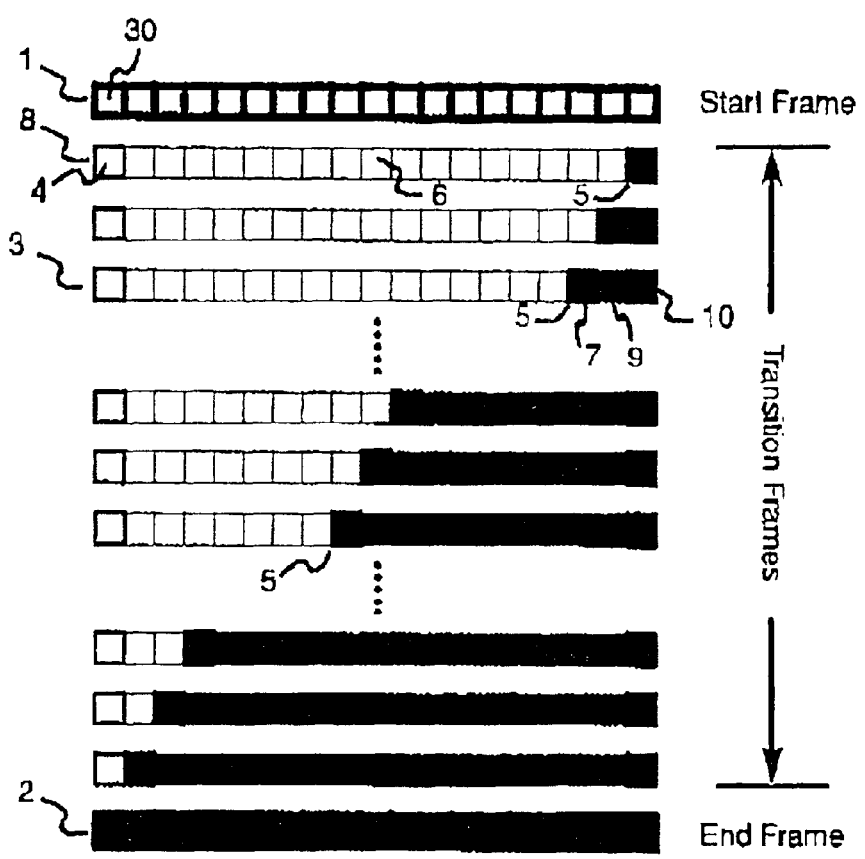
FIG. 1 is a block diagram of a single horizontal slice from a sequence of pictures in a horizontal curtain wipe transition generated according to the method of the present invention.

To more fully understand the present invention and the preferred embodiment, a number of more detailed features of the MPEG compression standards will first be described.

MPEG achieves much of its compression efficiency by taking advantage of the similarity of one picture in the sequence to nearby pictures. This similarity arises because the pictures are often of essentially the same content, subject to some camera and object motion. MPEG divides each picture into a regular array of 16×16 pel 'macroblocks'. The term pel refers to the 'picture elements' at a given location in the reconstructed image that contains several channels of information. If the offset between a macroblock being coded and a nearby similar region in an earlier or later picture is known (the 'motion vector') then this offset and the content of the earlier or later region can be used to estimate the macroblock being coded. If the similar block is from an earlier picture this is known as 'forward prediction' while if it is from a later picture, this is known as 'backward prediction.' The difference between the predicted block and the actual block (the 'residual') is coded with a Discrete Cosine Transform' (DCT). According to previous practice, for this to work, the region referred to by the prediction had to be decoded before a macroblock could be reconstructed.

To facilitate the process and prevent the accumulation of errors, MPEG codes three different picture types: 'Intra-coded' I-pictures, 'prediction coded' P-pictures and 'bi-directionally prediction coded' B-pictures. I-pictures are encoded without reference to any other pictures in the sequence. The macroblocks in the picture are coded directly with a DCT (similarly to the techniques used in still picture compression such as the JPEG standard). P-pictures use forward motion prediction from the most recent I- or P-picture (known collectively as reference pictures). B-pictures use bidirectional prediction, where the macroblocks in the picture are predicted from either the most recent past reference picture or the next reference picture or both. MPEG organises the video into a series of contiguous pictures that are termed a Group Of Pictures (GOP). A typical GOP might consist of pictures codes as I-, P- and B-pictures in a sequence like I,B,B,P,B,B,P,B,B.

Each macroblock in a picture contains three channels of information, namely an intensity channel (Y), two colour difference channels (Cr and Cb) and motion vector information. Within a P or B picture, not all macroblocks will always be suitable for the same form of coding. There are therefore two kinds of macroblock: 'Intra-coded' macroblocks and 'Prediction coded' macroblocks.

'Intra' coded macroblocks contain no motion information and directly code each of the channel blocks in the macroblock using a DCT transform. Each macroblock contains up to 128×8 pixel blocks. There are 4 pixel blocks for the intensity channel and 1, 2 or 4 pixel blocks for each of the colour difference channels. All of the macroblocks in an I-picture are 'intra' coded. 'Intra' coded macroblocks may also be used in P-pictures and B-pictures if the motion compensated coding fails to produce an acceptable coding quality.

Most of the macroblocks in an MPEG picture will be Prediction-coded macroblocks. These may use either forward prediction or backward prediction or both. Forward prediction macroblocks predict the block from the last reference (I- or P-) picture using the nearest matching block in the equivalent region of that picture. Backward prediction macroblocks predict the block from the next reference (I- or P-) picture using the nearest matching block in the equivalent region of that picture. Bidirectional prediction macroblocks predict the block from both the last and the next reference (I- or P-) pictures using the average of the nearest matching block in the equivalent region of each picture. The prediction-coded macroblock stores the 'motion vector' information and the DCT encoded residual.

Macroblocks are always coded in the same order. Each horizontal row is coded in order from the macroblock in the leftmost column to the macroblock in the rightmost column, and the rows are processed from the top row to the bottom row. Under some circumstances macroblocks are not coded. These are termed skipped macroblocks. Skipped macroblocks are used in both P- or B-pictures. Each coded macroblock in a picture carries information about its position in the picture relative to the last coded macroblock. When reconstructed, the skipped macroblocks have zero DCT residuals and assume default values for the motion information. In a P-picture, they assume zero length motion vectors, while in a B-picture they assume the same motion vector as the last coded macroblock.

The macroblocks in a picture are organised into slices. A slice is a set of macroblocks which are consecutive in a 'row first then column' ordered sequence from a single picture. In MPEG1 these slices may extend across more than one row. In MPEG2, the slice must fall entirely within one row.

The preferred embodiment of the present invention provides a number of transition templates suitable for insertion in compressed digital video and methods of generating same. This invention enables the efficient insertion of compactly representable transition pictures between the pictures of an MPEG video sequence through operations in the compressed domain. The present invention provides for the creation of a wide range of possible transition effects including but not limited to wipes, fades, complex geometric transitions and holds.

In the preferred embodiment, the transitions are achieved by inserting a series of P-pictures or B-pictures into the compressed digital video, the macroblocks of which are constructed through motion compensated prediction from either the reference picture preceding the transition or the reference picture following the transition. If B-pictures are used then macroblocks that are the average of a macroblock from the preceding reference picture and the next reference picture can be efficiently constructed. Very compactly representable transitions are achieved by taking advantage of the 'skip macroblock' feature and the differential pulse code modulation (DPCM) based compression of both the constant components and the motion vectors within a picture.

The primary application of this embodiment of the invention is in providing an efficient means for inserting transition pictures between existing MPEG video sequences without the need to recode the video sequences. When separate shots are assembled into a video, these transitions produce a more visually pleasing effect in moving from one shot to the next.

The preferred embodiment is also used to construct an MPEG slideshow from a series of still pictures using hold transitions to keep the picture on the screen and other transition pictures to produce visually pleasing transition effects. If the still pictures are a selected subset of pictures from a video sequence then the audio track associated with each picture may be retained and spliced with the video sequence to produce a multimedia 'abstract' or summary of the video in MPEG format.

The preferred embodiment of the present invention is described in further detail below.

As discussed earlier, B- and P-pictures contain difference information between themselves and a past and/or future reference picture. The mechanism for this is through motion vectors that point to a region within the reference picture that is similar, and DCT information which encodes the difference information between the reference block and the B- or P-picture block being coded.

The unit of comparison/encoding is the macroblock, which is a 16×16 pixel square of the original picture. Macroblocks contain motion vector information, constant information, and DCT information. Macroblocks are designed to be encoded efficiently so that redundant and replicate information does not need to be encoded.

In the present invention, the properties of macroblock encoding are used to efficiently construct special B and P pictures using a small number of specially coded macroblocks in combination with a large number of skipped macroblocks to produce whole picture effects which achieve a transition from one reference picture to the next in a smooth and visually pleasing way.

Using the method of the present invention, transition effects are inserted, where required, into an existing MPEG, or incorporated into a new MPEG by inserting or replacing B- and P-pictures between consecutive reference pictures (I- or P-pictures) to create a visual transition between the two pictures.

The present invention uses a number of key macroblock coding properties to code transition pictures. These include the fact that:

a) Skipped macroblocks in B-pictures result in the decoder inserting a macroblock which copies the macroblock type (forward, backward or both motion vectors) and the motion vectors from the previous Macroblock in the current picture and have no DCT residual coefficients. That is they copy the corresponding macroblock from the previous picture with an offset equivalent to that in the last coded macroblock; and b) Skipped macroblocks in P-pictures result in the decoder inserting a macroblock which resets the motion vector to be zero length and has no DCT coefficients. That is, they copy the corresponding macroblock in the previous reference picture; and c) Macroblocks in a B-picture use either forward motion estimation from the previous reference picture, or backward motion estimation from the next reference picture. In other embodiments, use is made of the average of a forward and a backward estimate.

Using these properties, the inventors have defined three simple macroblock types that are used to build transition templates. These macroblocks are:

a) Past Copy Macroblock (PCM): This macroblock type copies the corresponding macroblock from the previous reference picture (B- and P-pictures);

b) Future Copy Macroblock (FCM): This macroblock type copies the corresponding macroblock from the future reference picture (B-pictures); and c) Merge Macroblock (MM): This macroblock type averages the corresponding regions of the past and future reference pictures (B-pictures).

The present embodiment of the invention uses a small number of these special macroblocks in such a way that large numbers of the blocks in a synthesised picture are omitted or skipped, to produce whole picture transition effects. For all three macroblock types no DCT residual information is encoded, resulting in very little cost. Using these three defined macroblock types, together with the coding properties means that all skipped macroblocks after a Copy Macroblock will also be Copy Macroblocks (either past or future). In, B-pictures both PCMs and FCMs are allowed while in P-pictures only PCMs are allowed. It also means that all skipped macroblocks after a Merge Macroblock will also be Merge Macroblocks. MMs are only allowed in B-pictures.

Figure 11:
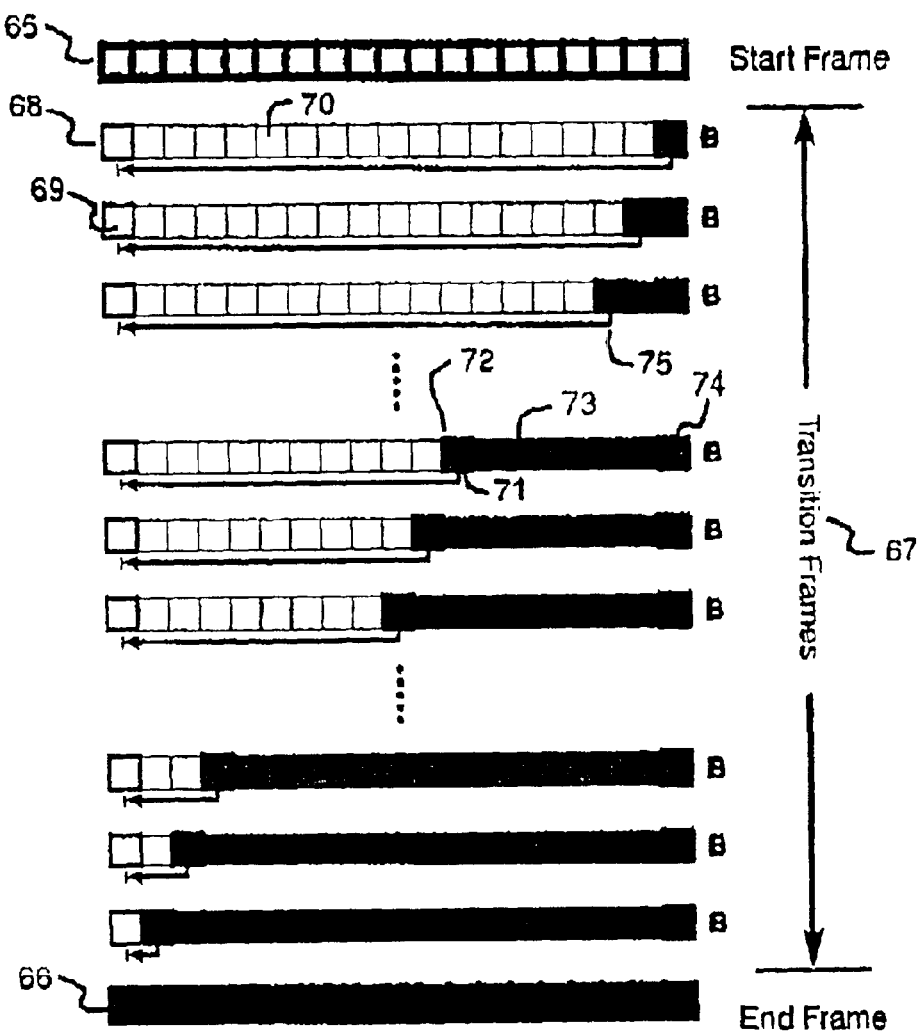
FIG. 11 is a block diagram of a single horizontal slice from a sequence of pictures using offset copy macroblocks along with past copy macroblocks in a horizontal slide-in transition which slides the next reference picture over the stationary previous reference picture, generated according to the method of present invention.
Figure 12:
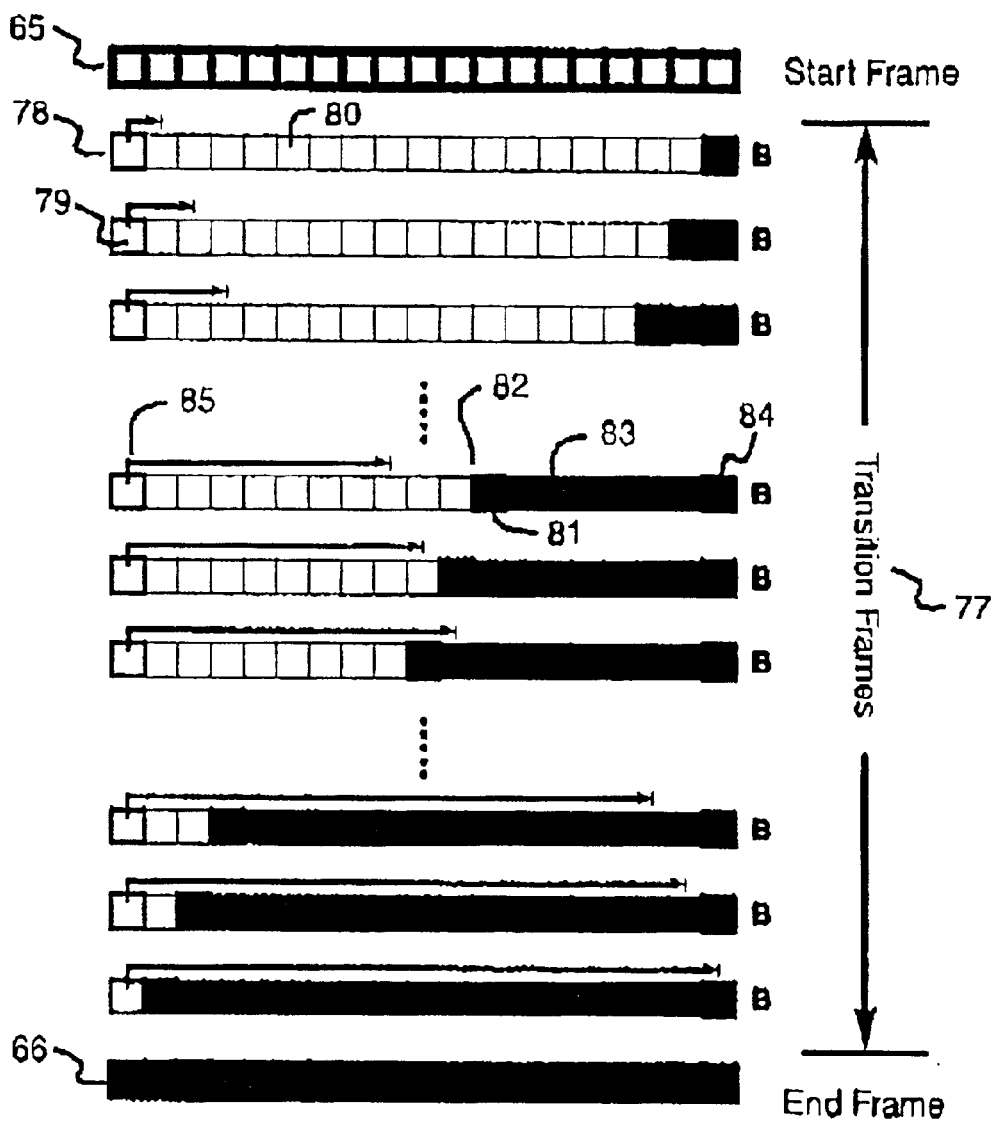
FIG. 12 is a block diagram of a single horizontal slice from a sequence of pictures using offset copy macroblocks along with future copy macroblocks in a horizontal slide-out transition which slides the old reference picture out, revealing the stationary next reference picture, generated according to the method of present invention.
Figure 13:
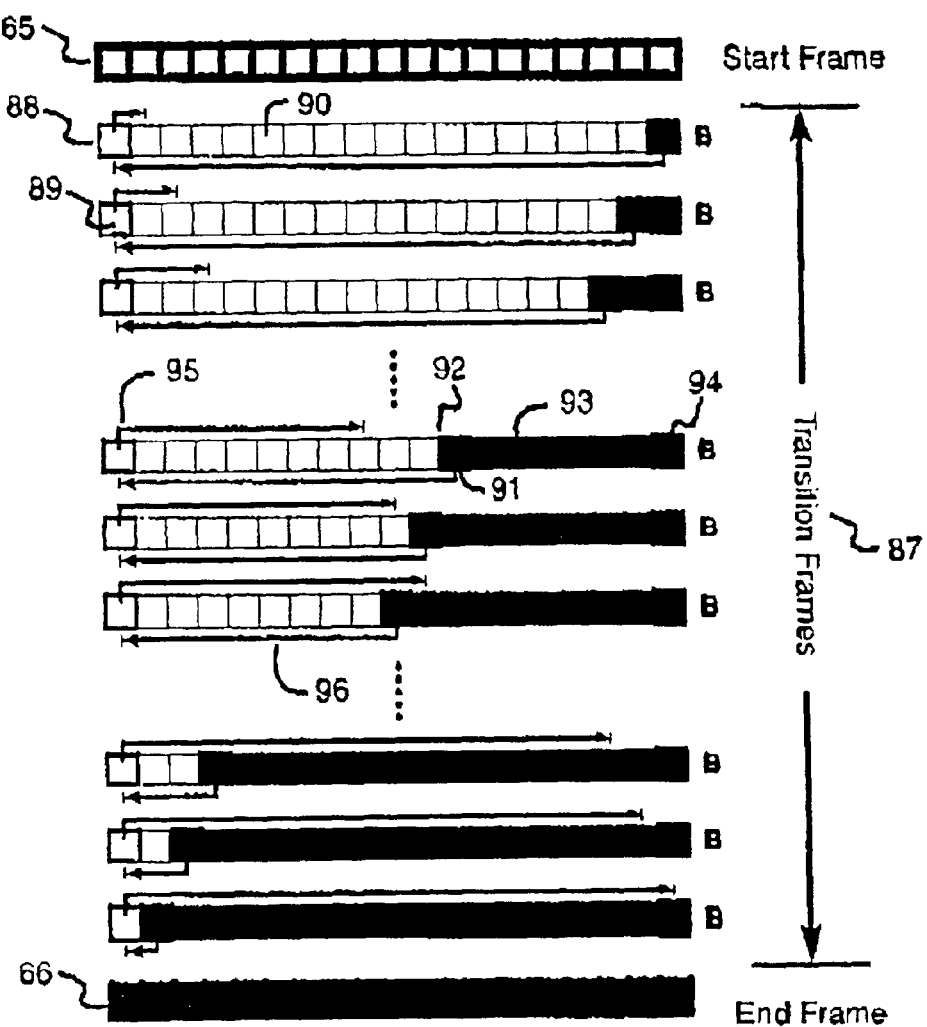
FIG. 13 is a block diagram of a single horizontal slice from a sequence of pictures in a push transition using offset copy macroblocks to slide the next reference picture in appearing to push the previous reference picture out, generated according to the method of present invention.

In FIGS. 1 to 8, Past Copy Macroblocks (PCMs) are shown in white, Merge Macroblocks (MMs) are shown in light grey and Future Copy Macroblocks (FCMs) are shown in dark grey. PCM, FCM and MM Macroblocks which are omitted or skipped are shown with a dotted outline. These are reinserted by the decoder. Macroblocks from the original pictures are shown with a thick outline and are coloured so that the PCMs and FCMs which reference them reflect their colour. In FIGS. 11, 12 and 13 OCM are shown with the arrows to indicate the motion vector offset.

Referring to the figures, FIG. 1 shows a block diagram of a single horizontal slice from a sequence of pictures in a curtain wipe transition template generated according to the method of the present invention. In that figure a simple curtain wipe transition is achieved where one reference picture changes into the next using a vertical sliding curtain effect.

As seen in FIG. 1, a picture 1 is the last picture before a transition and a picture 2 is the first picture after the transition. Picture 1 and 2 are I- or P-pictures from the original sequence. The inserted transition pictures 3—which are B-pictures—between pictures 1 and 2 are each illustrated by a single slice forming one row from the picture. The other rows in the same picture will look substantially the same.

A wipe boundary 5 separates the macroblocks reconstructed from the picture before the transition from the macroblocks reconstructed from the picture following the transition. In this example, where the transition is by curtain wipe, when the transition is played the curtain moves across the picture from right to left as the last picture 1 before the transition (the past reference picture) is replaced by the first picture 2 after the transition (the last reference picture).

Initially, a first macroblock 4 in a first slice 8 is a Past Copy Macroblock (PCM), and is shown in white. Macroblock 4 copies the corresponding macroblock 30 from the previous reference picture which, in this case, is the last picture before the transition, that is, picture 1. The following macroblocks 6 up to the wipe boundary 5 are skipped. These skipped macroblocks 6 copy the Past Copy Macroblocks to their left. They are therefore decoded as Past Copy Macroblocks.

A Future Copy Macroblock (FCM) 7 is placed after the wipe boundary 5, and the macroblocks 9 after that to the end of the slice are skipped, except for the last macroblock 10 in the slice which, for compatibility with MPEG2, is explicitly coded as a PCM.

At each subsequent slice following the first slice 8, the location of the wipe boundary 5 is moved one macroblock to the left, resulting in less of the transition's first picture 1 and more of the transition's final picture 2 in the synthesised picture. For a faster transition, the wipe boundary may be moved more than one macroblock per picture. For a slower transition the wipe boundary may be moved one block every two or more pictures.

Once this transition template has been generated, it may be inserted between any two reference pictures in a compressed MPEG data stream to create a transition effect bridging those reference pictures.

Figure 2:
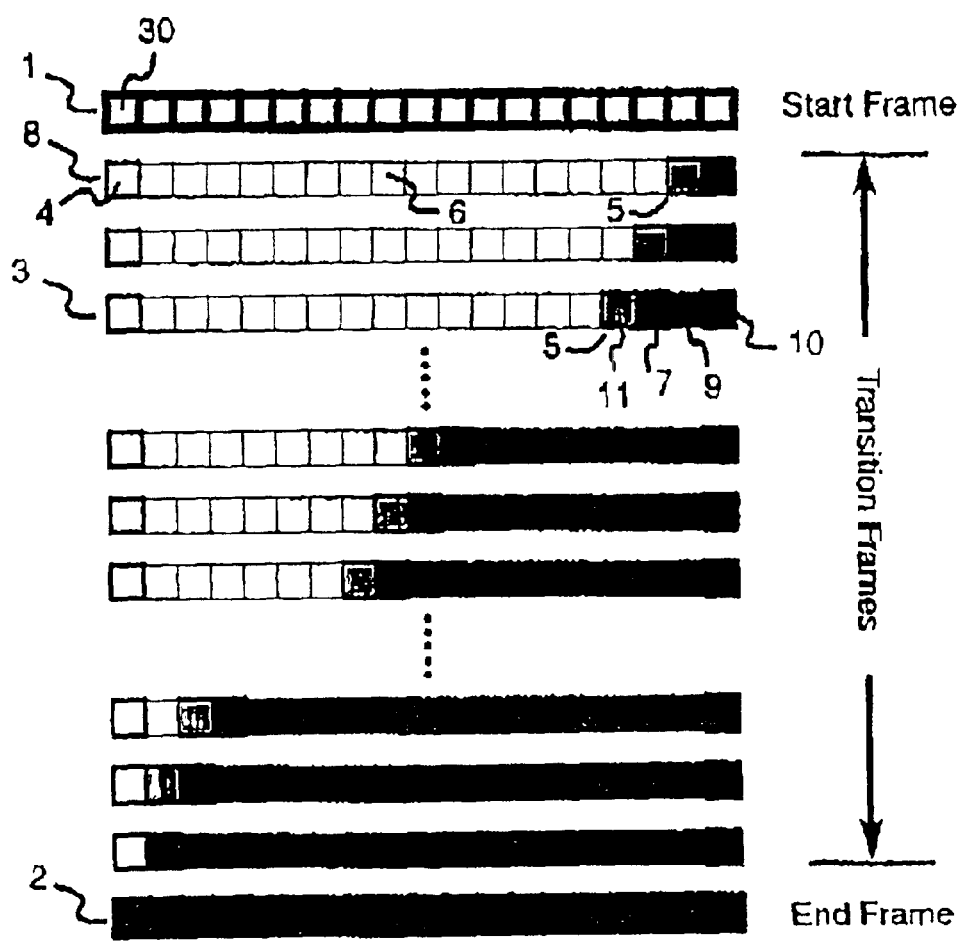
FIG. 2 is a block diagram of a single horizontal slice from a sequence of pictures in a modified horizontal curtain wipe transition with a Merge Macroblock used to produce a smoother transition.
Figure 3:
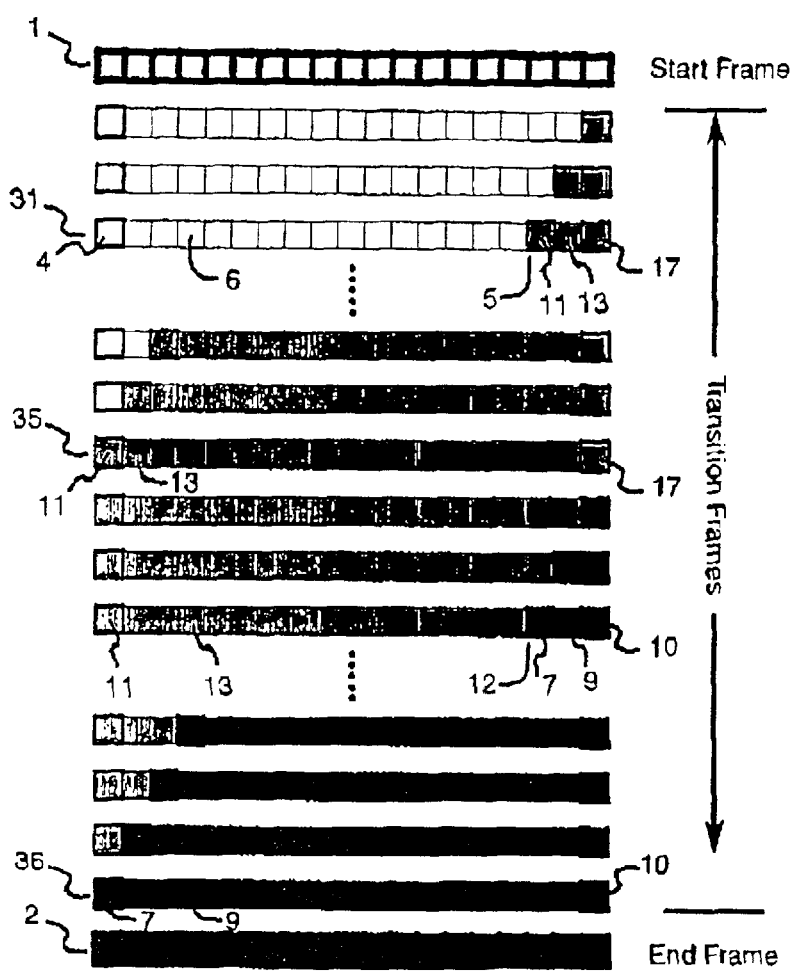
FIG. 3 is a block diagram of a single horizontal slice from a sequence of pictures in a Horizontal curtain wipe transition which transitions through a picture which is an average of the start picture and the end picture.
Figure 4:
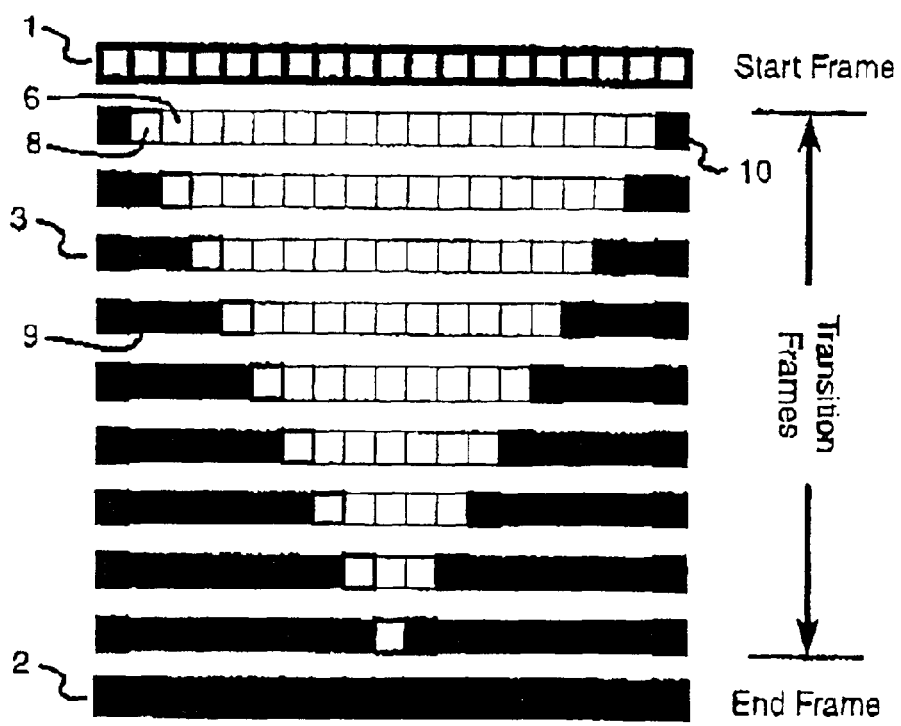
FIG. 4 is a block diagram of a single horizontal slice from a sequence of pictures in a horizontal double curtain wipe transition.
Figure 5:
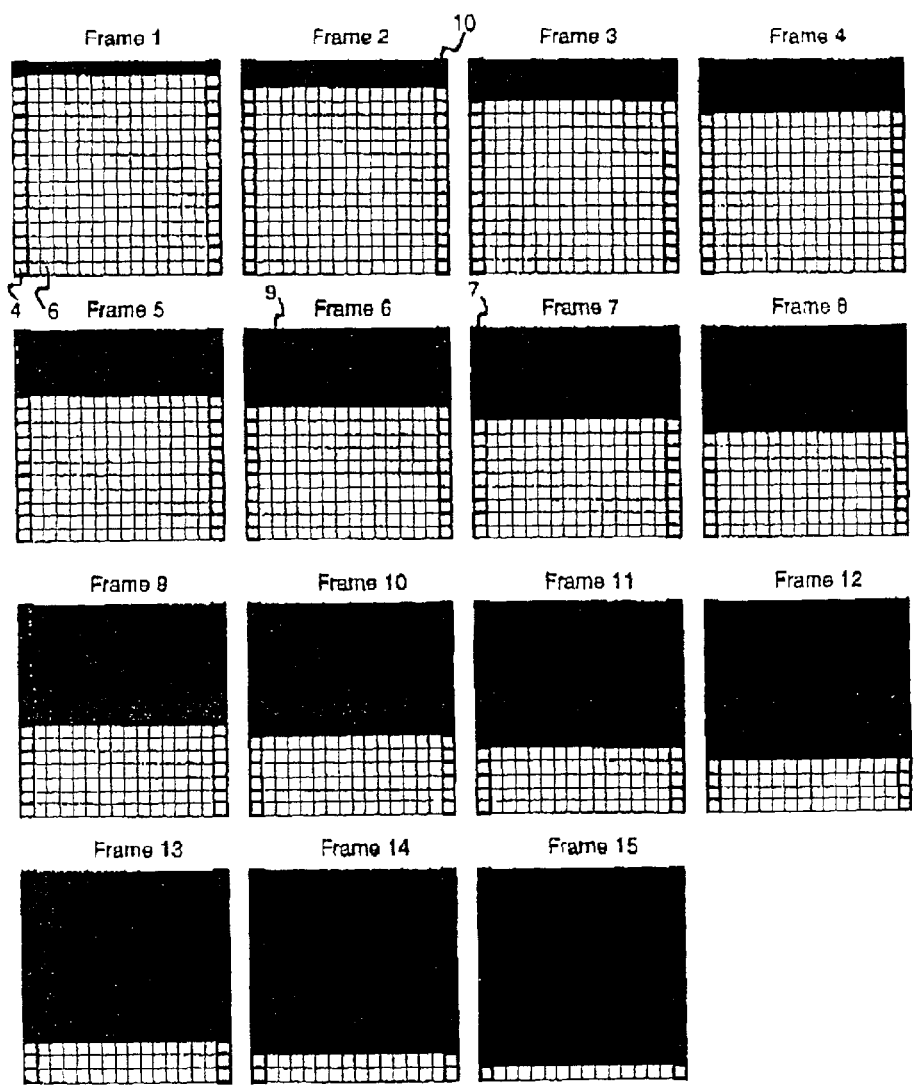
FIG. 5 is a block diagram of 15 pictures of the macroblocks of a small (256×256 pixel) picture showing an example of a vertical wipe transition generated according to the method of present invention.
Figure 6:
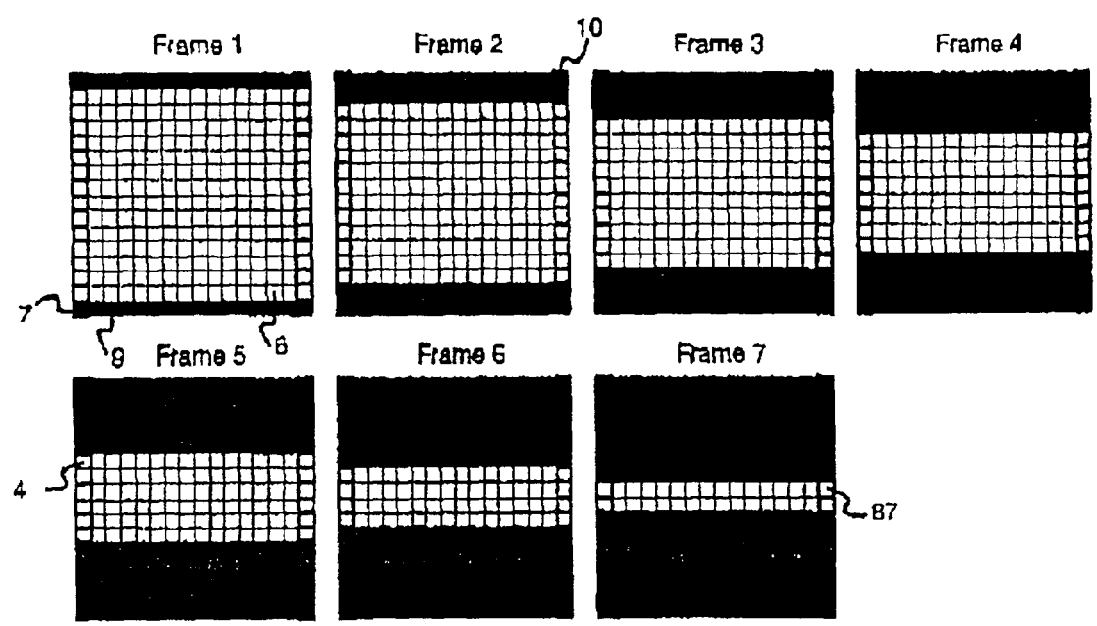
FIG. 6 is a block diagram of 15 pictures of the macroblocks of a small (256×256 pixel) picture showing an example of a double vertical wipe transition generated according to the method of present invention.
Figure 7:
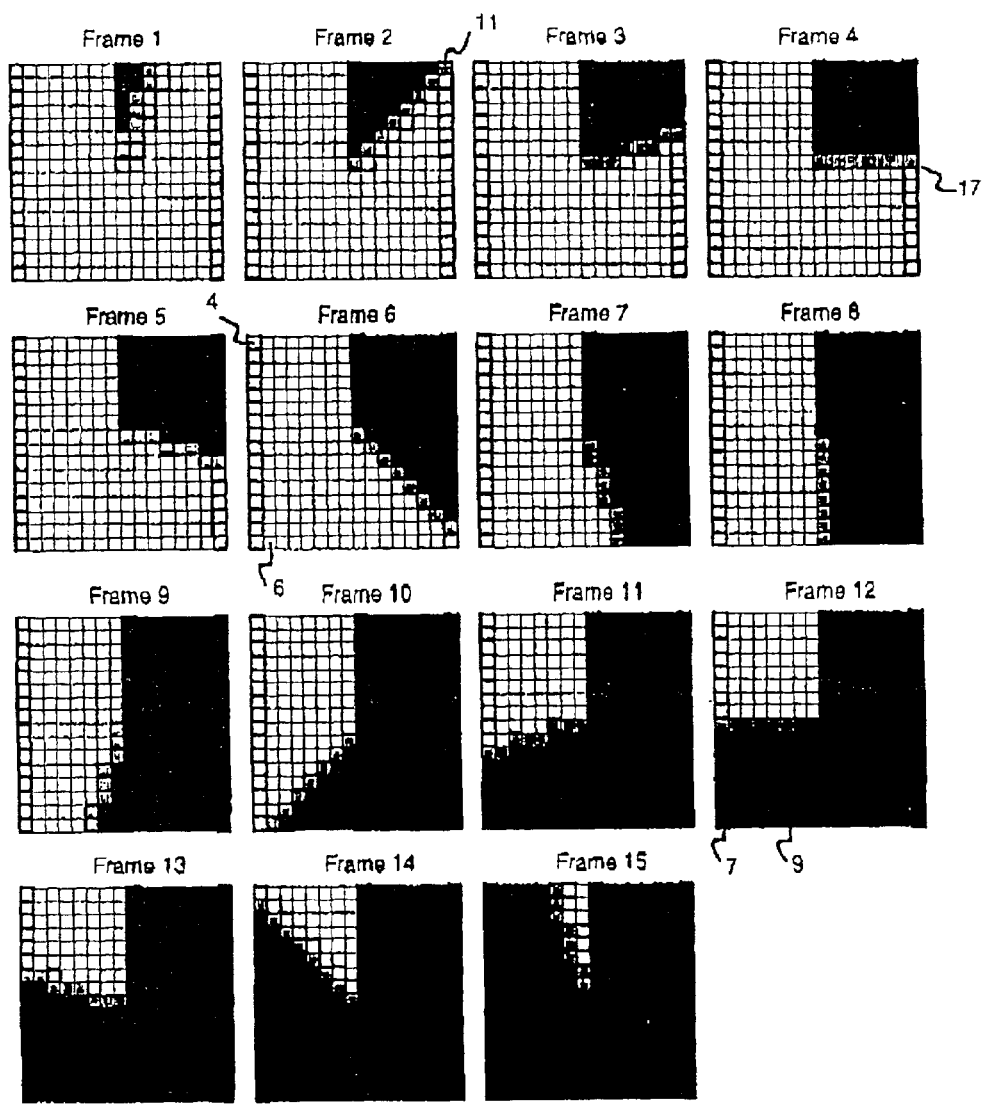
FIG. 7 is a block diagram of 15 pictures of the macroblocks of a small (256×256 pixel) picture showing an example of a two dimensional radial wipe transition generated according to the method of present invention.

A number of variations on this curtain transition effect are envisaged and are included within the scope of the invention. One such variation is illustrated in FIG. 2 where corresponding features are denoted by corresponding reference numerals. In this embodiment, in order to give a softer edge to the curtain wipe boundary 5, a Merge Macroblock 11 has been added between the skipped Past Copy Macroblocks 6 and the Future Copy Macroblocks 7.

An alternative transition effect of another embodiment is illustrated with reference to FIG. 3 where, again, corresponding features are denoted by corresponding reference numerals. In this example, a slide projector style of transition is achieved using a two stage transition which has a first wipe boundary 5 and a second wipe boundary 12. In the first stage, the transition pictures start with a picture consisting of rows which start with a Past Copy Macroblock 4 followed by a series of skipped Past Copy Macroblocks 6 prior to the first wipe boundary 5 which is followed by a Merge Macroblock 11 followed by a series of skipped Merge Macroblocks 13 and terminated by a Merge Macroblock 17. At the end of the first stage 35, the transition pictures progress to a picture with rows consisting of a Merge Macroblock 11 followed by a series of skipped Merge Macroblocks 13, then terminated by a Merge Macroblock 17. In the second stage of the transition, the transition pictures start with a picture with rows consisting of a Merge Macroblock 11 followed by a series of skipped Merge Macroblocks 13 before the second wipe boundary 12 which is followed by a Future Copy Macroblock 7 then by a series of skipped Future Copy Macroblocks 9 and terminated by a final Future Copy Macroblock 10. The second stage transition pictures progress to a picture with row 36 consisting of a Future Copy Macroblock 7 followed by a series of skipped Future Copy Macroblocks 9, then terminated by a final Future Copy Macroblock 10. This enhances the slide projector style of effect with a complete blend of the two pictures before progressing to the new slide.

The preferred embodiments of the present invention also allow a host of transition templates to be created this way. Essentially, these embodiments allow for the progressive replacement of a first picture by a second picture in one or more of a variety of ways. Transition effects ranging from, for example:

1. A horizontal double wipe, such as that illustrated in FIG. 4;
2. A vertical curtain wipe, such as that illustrated in FIG. 5; and
3. A vertical double wipe, such as that illustrated in FIG. 6.

In other embodiments different transition effects are created by the method of the present invention. All of these transitions can be considered as variations of the wipe transition.

More complex two-dimensional effects are also possible. In some embodiments the arrangement of macroblocks varies from one row to the next in each picture. The effects produced include diagonal wipes, iris effects and complex patterns in which arbitrary blocks change from the past reference picture to the future reference picture. For example in FIG. 7 there is illustrated a two dimensional radial wipe transition that is created by arranging a wipe boundary 17 in a radial pattern. Each of the fifteen pictures shown includes all of the macroblocks from each picture of a small (256× 256 pixels) video. In this transition, the PCM macroblocks 4, the FCM macroblocks 7 and the MM macroblocks 11 are used to create the transition.

As with other templates, repeated macroblock sequences within a slice are, in some embodiments, replaced by a single macroblock with the subsequent repeated blocks skipped.

For MPEG2 compatability, the final macroblock on the row is never skipped.

Figure 8:
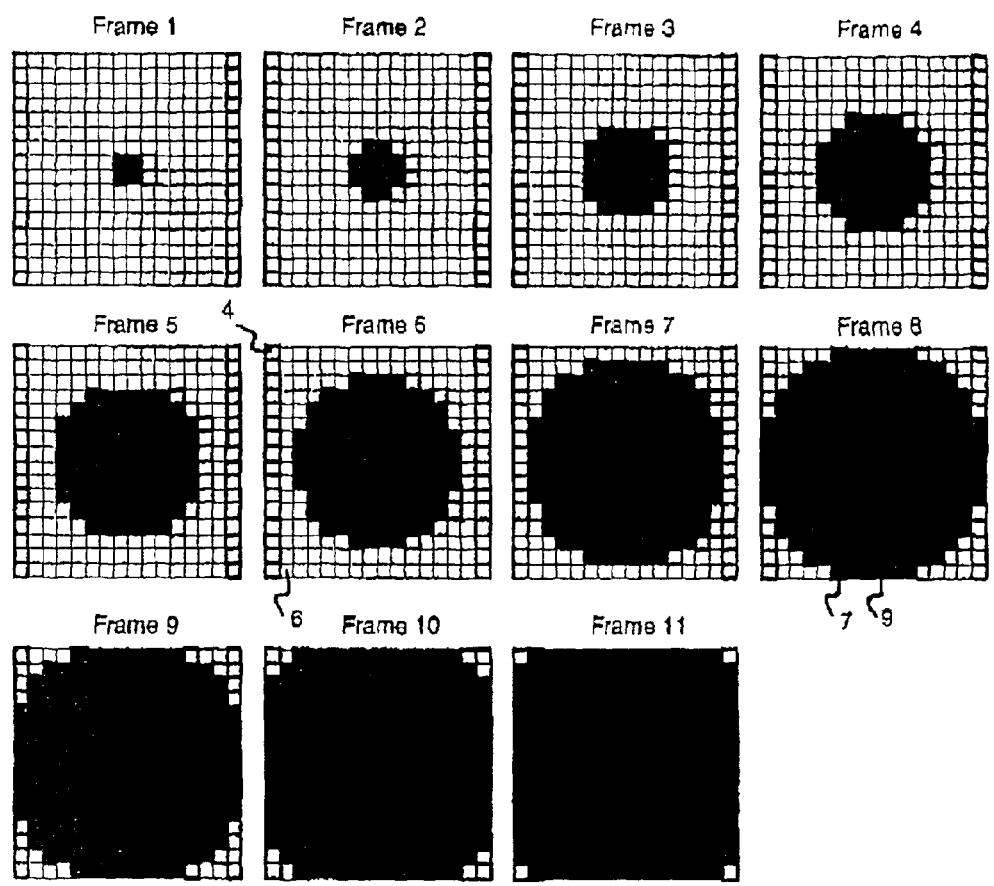
FIG. 8 is a block diagram of 15 pictures of the macroblocks of a small (256×256 pixel) picture showing an example of a two dimensional iris wipe transition generated according to the method of present invention.

As will be appreciated by a skilled addressee, from the teaching herein, the number of such patterns available to be created is almost limitless. A further example, an iris wipe, is illustrated in FIG. 8.

In some embodiments, hold transition templates are generated using the method of the present invention. In a slideshow application the method of the present invention is used to hold an image on the screen for a much longer period than the normal picture time by effectively duplicating each picture a large number of times. Using this method, a series of I-pictures are presented as a slideshow in an MPEG format.

Other applications include using hold transition templates to create a slideshow from existing MPEG sequences, or to create completely new slideshow sequences. In the first application, the embodiment of the invention is used to take an MPEG video as input and produce a compact 'summary' of the video sequence in MPEG format. The 'slideshow' is usually linear, in which the slides appear in the order they appear in the original video. However, in other embodiments the 'slideshow' is non-linear, in that the slides are reordered with respect to the original video. In either case, it is possible to preserve the original audio in whole or in part and to maintain some form of synchronisation with the pictures forming the slideshow. The result is a compact MPEG compatible slideshow that summarises the content of the video in a much compressed form. Preferably, the ambience of the associated original soundtrack is retained. Alternatively a slide sequence is produced in non-linear order with the sound associated with the original portions of the video providing a useful context.

In the second application, the method of the present invention is used to take a series of still images, not originally sourced from video, and combine them with a separate audio stream as a background to produce a new multimedia presentation of the slides which is viewable in a standard MPEG video player.

The hold transition template of the preferred embodiments is preferably generated using an efficient picture repetition mechanism which is used to maintain a stable display of the image while preserving its timing information and in such a way that the resulting stream will play on any compliant MPEG player. The technique used inserts efficiently coded pictures into the video sequence which cause the original coded I-picture to be redisplayed. The original audio associated with the slide (possibly further compressed) or new audio, is spliced to the new video sequence. The selected pictures, if sourced from a video sequence, retain their original time signature. For images sourced from a video in sequence, this enables the complete sound track to be retained in synchrony (perhaps modified to reduce the bit rates).

The process of generating an MPEG slideshow is, for convenience broken into four steps, namely: the extraction or generation of the slide pictures; the generation or selection of the slideshow transition template; editing the audio stream; and the packetising of the video and audio. Naturally, if audio is not required, the slideshow is generated using only the first two steps.

When extracting or generating the slide pictures, the aim is to generate a slide picture for the slideshow MPEG. For an output MPEG video the slide pictures are converted to 'I' pictures in the MPEG video. If the slide pictures come from an MPEG source video, then one of a number of methods is used. One such method searches forward from the desired picture until the next "I" picture is reached, and this "I" is simply used as the slide picture "I". Another method re-encodes the desired picture into an 'I-' picture from a 'B-' or 'P-' picture. This re-encoding requires that a target bit rate for the picture be determined and used for adjusting quantisation factors during the encoding process.

Alternatively, if the source picture for the slideshow is a still image, the still image is encoded as an MPEG 'I' picture. The end result is a first slide reference picture which is an I-picture.

Figure 9:
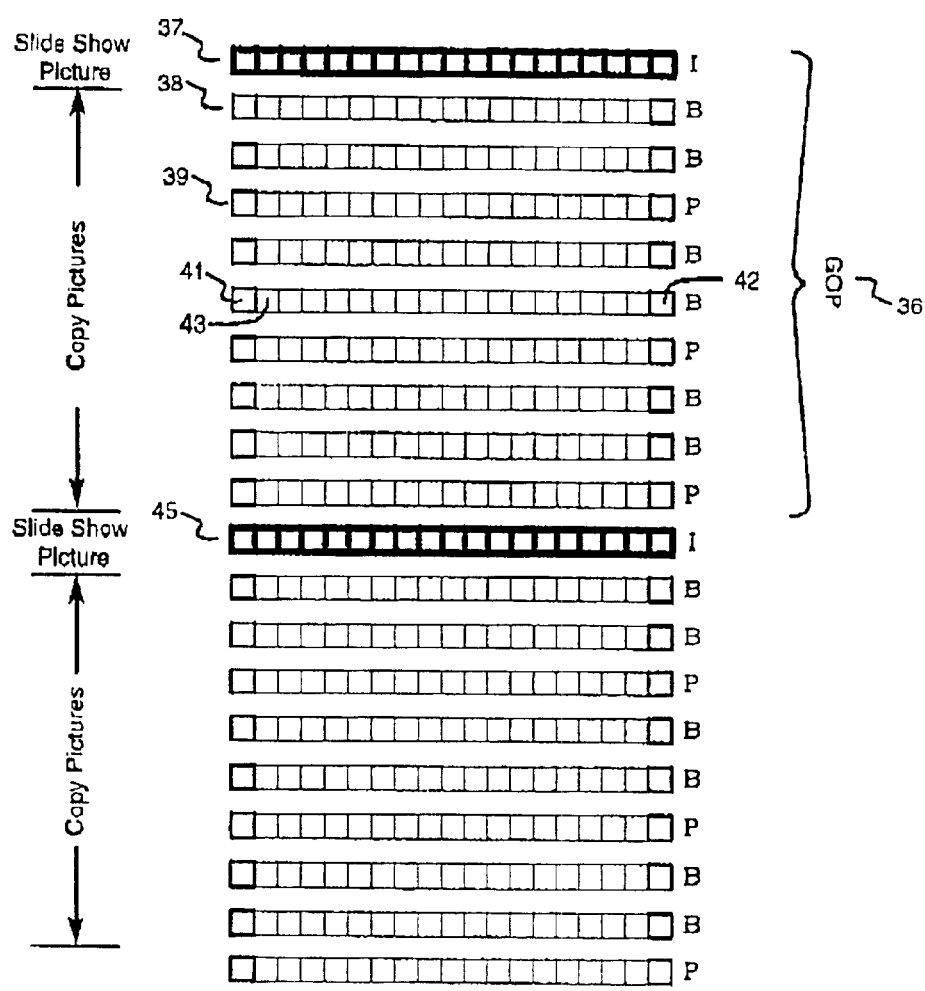
FIG. 9 is a block diagram of a single horizontal slice from a sequence of pictures in a hold transition consisting of B and P pictures, generated according to the method of present invention.

The step of generating the slideshow transition template is similar to that used to construct the wipe transitions above. A two slide sequence is illustrated in FIG. 9. As shown, the slideshow transition template consists of a series of Group of Pictures or GOPs 36, with one new slide shown per GOP. Each GOP contains one Intra-Coded Picture 37 which represents a single "slide" to be shown. The rest of the GOP is filled with 'Copy' B 38 and P 39 pictures in the typical 'BBPBBP' organisation. These copy pictures consist of rows which start with a Past Copy Macroblock or PCM 41 and end with a Past Copy Macroblock or PCM 42. All of the intervening macroblocks 43 are skipped. The skipped macroblocks are re-inserted by the decoder as PCMs. The next I picture 45 is then followed by a similar set of copy pictures.

Given the time spacing required between slides, GOPs are constructed using one "I" picture and the required number of copy pictures to fill up the GOP. The GOP structure is IBBPBBP . . . BBP.

Figure 10:
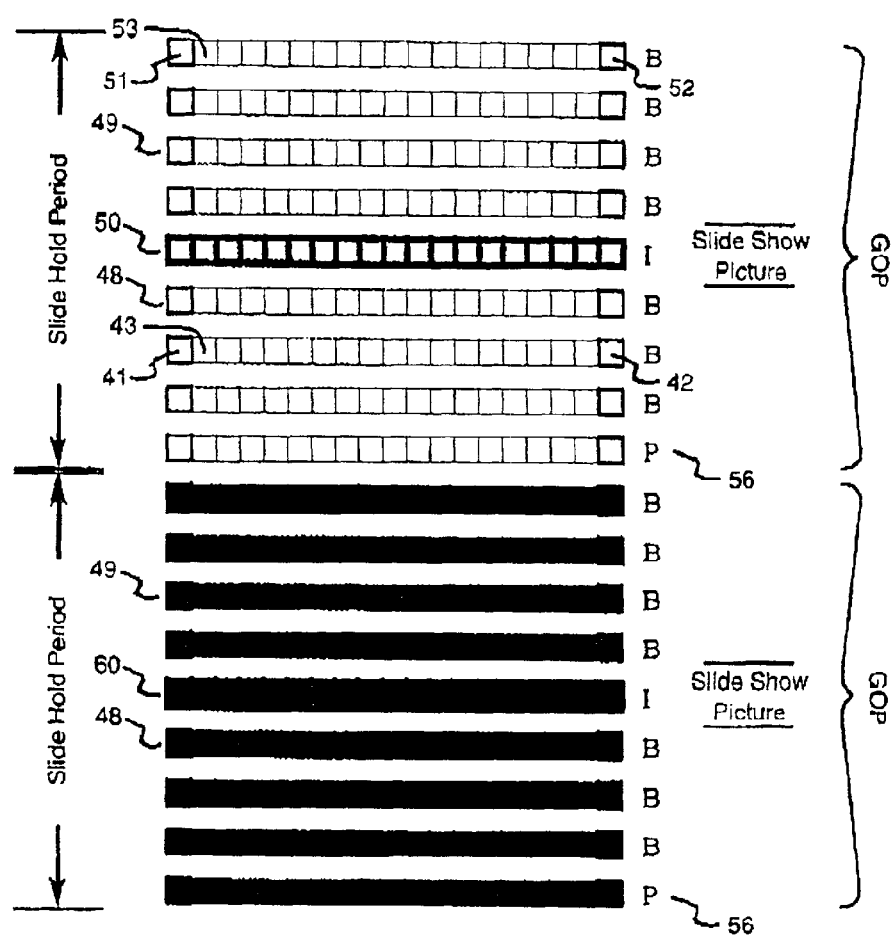
FIG. 10 is a block diagram of a single horizontal slice from a sequence of pictures in a hold transition consisting entirely of B pictures, generated according to the method of present invention.

Alternatively, with minimal use of P-pictures, B-pictures to construct a nearly symmetric GOP structure in which copy blocks are placed before and after the slideshow picture to form a GOP with an atypical BB . . . BBIBB . . . BBP configuration. This arrangement is illustrated in FIG. 10 which illustrates a two picture slideshow with two I pictures, where the light grey blocks are associated with a first picture 50 and the dark grey blocks are associated with a second picture 60. The copy pictures 48 after their corresponding I picture are constructed in the same way as the B pictures in FIG. 9, with the last picture in the GOP 56 being a P-picture constructed similarly to the P-pictures in FIG. 9. The copy pictures 49 before their corresponding I picture are constructed with rows of macroblocks, starting at macroblock 51 and ending at macroblock 52 with a Future Copy Macroblock (FCM) with all intermediate macroblocks 53 skipped. These skipped macroblocks are re-inserted by the decoder as FCMs.

The maximum spacing required by the MPEG standard between 'I' pictures is 200 pictures. Therefore, if a hold time is required which is greater than 200 frames, then the 'I' picture is repeated the required number of times.

The next step involves editing the audio stream. If the original timing of the slide pictures is to be preserved along with the original audio, then the original audio track is used to construct the packetised slideshow.

If the original timing of the slidepictures is lost, then the original audio track is edited. This is done in this embodiment by determining the time points of all the slide pictures and cutting the audio at each of these points for the length of time equivalent to the spacing between the slides in the final slideshow.

The final step involves packetising the video and the audio. Using the method of this preferred embodiment, the slideshows are packetised either as a constant bit rate stream or a variable bit rate stream. As a constant bitrate stream, the number of bits used per GOP is maintained at the given bit rate of the video. Within a GOP, the slideshow varies significantly between I-pictures and the copy B and P pictures. Packetising the slideshow video stream and audio stream should be done with care to avoid buffer underflow and overflow errors.

Because most of the macroblocks in copy pictures are skipped these copy pictures are coded with a very small number of bits.

Not only are the preferred embodiments used to generate wipe transition templates and hold transition templates, but they are also applicable to more advanced transition templates that are constructed by using explicitly coded macroblocks. These are somewhat more expensive to code than the transition templates described above but allow the production of effects which are not possible with the PCM and FCM macroblock types. While more expensive than the transition templates described above, they are still less expensive than traditional methods of decoding and explicitly recoding all of the macroblocks in a transition. Examples of these more complicated types of synthetic Macroblock are:

(a) Offset Copy Macroblocks (OCM). These are macroblocks with non-zero motion vector information and no DCT residual information. They copy their data from a different spatial location in the reference picture. In B-pictures, Offset Copy Macroblocks which are skipped are correctly reinserted by the decoder. Pictures are therefore efficiently coded with sequences of OCMs with the same motion vectors. These macroblocks reference either Past or Future reference blocks, producing two varieties of OCM, Past Offset Copy Macroblocks (POCMs), and Future Offset Copy Macroblocks (FOCMs).

(b) Fading Macroblocks (FM). These are macroblocks with a motion vector having non-zero values for one or more of the block DCT residual components with zero horizontal and vertical frequency (the DC components) and zero values for the DCT residual components with non-zero frequency (the AC components). These macroblocks reference either the previous reference picture (Past Fading Macroblock—PFM) or the next reference picture (Future Fading Macroblocks—FFM), but add an offset to the intensity to brighten or darken the block. These blocks cannot be skipped.

An example of an Offset Copy Macroblock (OCM) is one where all of the motion vectors point one macroblock up in the Y direction. A B or P picture is constructed from offset blocks to display a shifted version of the reference picture. When constructing such a block, care should be taken at the boundaries so that the offset block does not lie outside the picture. In one embodiment, the offset used in the OCMs is in half pel units, so the resulting motion in the transition is very smooth. Alternative offsets are also envisaged.

Many different types of transitions are constructed by building up B or P pictures with just a few different types of OCMs, particularly when in combination with copy macroblocks.

Referring to FIG. 11, an improvement of the curtain wipe transition is shown. In this example, a past reference picture 65 appears to remain stationary in the transition pictures while a future reference picture 66 appears to slide in over it. The transition template of the present invention, as applied to this embodiment, is inserted between the reference pictures 65 and 66 as a series of transition pictures 67. The first picture 68 is a B-picture consisting of rows with a first macroblock which is a PCM 69 referring to the first reference picture 65, followed by zero or more PCMs 70 which are skipped (to be later reinserted by the decoder). A macroblock 71 that immediately follows the wipe boundary 72 is a FOCM that references the second reference picture 66. The series of macroblocks 73 that follow the first FOCM 71 are skipped. These skipped FOCMs 73 are reinserted by the decoder with the same motion vector information as the first FOCM 71. The last FOCM on the row 74 is never skipped.

The motion vectors in the macroblocks are illustrated by the arrows 75 indicating the offset to the reference position in the past reference picture. The effect is to slide the next reference picture 66 in, over the last reference picture 65.

Rather than slide the next picture in to cover the stationary previous picture, it is also possible to slide the previous picture out to reveal the stationary next picture. This slide-out transition is illustrated in FIG. 12. For this embodiment, the transition template of the present invention is inserted between the reference pictures 65 and 66 as a series of transition pictures 77. A first picture 78 is a B-picture consisting of rows whose first macroblock is a POCM 79 referring to the first reference picture 65 followed by zero or more POCMs 80 which are skipped and (to be later reinserted by the decoder). A macroblock 81 that immediately follows a wipe boundary 82 is a FCM that references the second reference picture 66. The series of macroblocks 83 following the first FCM 81 are skipped. These skipped FCMs 83 are reinserted by the decoder. The last FCM on the row 84 is never skipped.

The motion vectors in the macroblocks are illustrated by the arrows 85 indicating the offset to the reference position in the future reference picture. The effect is to slide the previous reference picture 65 out, revealing the next reference picture 66.

It is also possible to animate both the past reference picture and the next reference picture to give the impression that the next reference picture is pushing the past reference picture out. FIG. 13 illustrates this push transition. In this embodiment, the transition template of the present invention is inserted between the reference pictures 65 and 66 as a series of transition pictures 87. A first picture 65 is a B-picture consisting of rows whose first macroblock is an POCM 88 referring to the first reference picture 65. The series of macroblocks 83 to the right of the POCM 88 are skipped, which achieves a relatively inexpensive transition. Those macroblocks which are skipped after the POCM 88 that reference the first reference picture 65, are reconstructed as POCM with the same motion vector information as that POCM. A macroblock 91 immediately to the right of the wipe boundary 92 is an FOCM that references the second reference picture 66. A series of macroblocks 93 to the right of the FOCM 91 are skipped. Those skipped FOCMs 93 after the first FOCM 91 that reference the second reference picture 66 are reconstructed with the same motion vector information as that FOCM 91. The last FOCM on the row 94 is never skipped.

The motion vectors in the macroblocks are illustrated by the arrows 95 and 96 and indicate the offset to the reference position in the appropriate reference picture. The affect is to slide the next reference picture 66 in, which as it moves appears to push the previous picture 65 out.

A transition using the PFM and FFM macroblocks is illustrated with reference to FIG. 14. In this example, a compound fade-out/fade-in transition template is constructed. This transition fades from a first reference picture 100 to a black picture 101 which is coded as an I- or P-picture. This transition is then followed with a fade-from-black transition which fades from the black picture 101 to the next reference picture 102. The fade-to-black transition is composed of a set of P-pictures 103, each of which copies each macroblock in the previous reference picture and adds a constant offset using a set of Past Fading Macroblocks (PFM) 105. Subsequent P pictures in the set do the same thing using the previous P-picture as a reference. Because each of these pictures references the previous P-picture, the constant offsets compound, causing the series of transition pictures to change intensity in a linear fashion. With a negative offset the pictures will decrease in intensity. Because the MPEG standard clips the resulting pixel values, this will approach a completely black picture. This black picture 101 is coded as a P- or an I-picture. For coding efficiency, B-pictures 106 whose rows start at row 107 and end at row 108 with a Merge Macroblock, are inserted between each P-picture 103 in the fade to black transition to produce a longer transition with little extra coding cost. The repeated Merge Macroblocks 109 in each row are, in some embodiments, skipped. For compatability with MPEG2 the last Merge Macroblock 108 on the row is not skipped.

Figure 14:
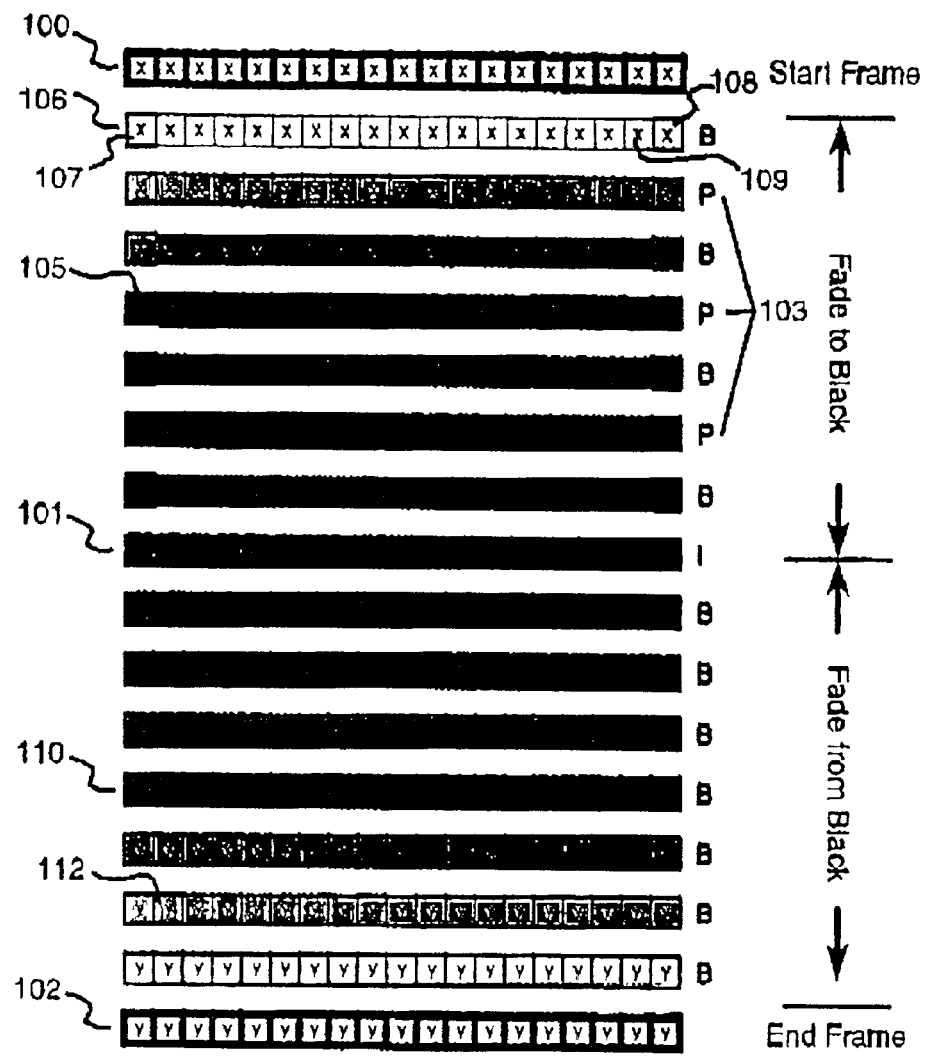
FIG. 14 is a block diagram of a single horizontal slice from a sequence of pictures in a compound fade transition which fades-out the old reference picture to black then fades-in to the next reference picture, generated according to the method of present invention.

Still referring to FIG. 14, the fade-from-black transition reverses the fading sequence of pictures. However, because the final reference picture 102 that the transition is fading into is after the transition, the transition cannot use P-pictures. In addition, because B-pictures cannot reference B-pictures, the transition must use B-pictures 110 populated by explicit Future Fade Macroblocks (FFM) 112 everywhere, which is somewhat less efficient than the construction of the fade-to-black transition. Each FFM uses a constant offset reflecting the intensity of the fade and references the final reference picture 100, fading eventually to the final picture 102.

In the compound transition example of FIG. 14, the alternative use of B and P-pictures in the transition reduces the coding requirement. It will be appreciated that such fade-to-black and fade-from-black transitions are, in other embodiments, compounded with other transitions.

It is also possible to compound the fade-to-black transition, for example, with an appropriately constructed wipe-from-black transition, to make a fade-to-black/wipe-from-black transition. Numerous other combinations are also envisaged. The compounding technique of the present invention allows the construction of a large variety of transition effects from a small set of pre-built sequences or templates.

As the rows of the transitions are constructed independently of each other, they are pre-constructed as transition elements and combined to form a large variety of transition pictures. For example it would be possible to have every row of a slide-in transition slide in at a different time. It is also possible to have the columns of a vertical slide in transition, slide in at different times.

The PFM and FFM macroblocks tend to be more expensive to use (in terms of bits required in the data stream) because they cannot be used in conjunction with skip blocks to replicate the fading behaviour within the picture. However, a fade from an earlier picture is achieved relatively efficiently with a pattern of I-B-P- . . . -B-P-B-P, where the first I is the picture, the P-pictures are made of PFM, and the B pictures are made of Merge Macroblocks, most of which are in fact skipped.

The preferred embodiments of the invention not only provide a number of different re-useable transition templates and a method of generating them, but also provide a method of inserting such templates into a compressed digital video data stream.

Part of the method of inserting the transition involves the minor modification of the compressed MPEG data stream to include the transition. The insertion typically occurs between any two reference pictures. The following description relates to the simple case of inserting transitions which use only B pictures.

Typically, a Group of Pictures will consist of a series of I, B and P pictures which arrive at the decoder in an order designed so that when each picture arrives all the necessary information to display the picture is already present. This ordering is known as the "encode order" and is generally different to the order in which the pictures will be displayed in the sequence. For example the sequence in encode order IBBPBBPBBPBBPBBPBBPBB would be displayed in the order 2,0,1,5,3,4,8,6,7,11,9,10,13,14,12, where these numbers are the picture numbers from the encode ordered sequence. This GOP is a non-closed GOP and the first two B pictures depend on the last P picture of the previous GOP.

Transitions based on inserting B-pictures are inserted in a number of places in the stream. Because the transitions are preferably between I- or P-pictures, it is necessary in some streams to recode one or more B-pictures as I- or P-pictures to create the first and last reference picture. If so, this necessitates the recoding of some of the B-pictures. As the typical picture pattern is IBBP, it is usually sufficient to recode no more than two B-pictures.

FIG. 15 illustrates a transition inserted before the first I-picture. In that figure, the picture type is shown in encode order in the first row of the table and the display order for each picture is shown in the second row. The transition is placed between the last P-picture of the previous GOP and the I-picture of the current GOP. This is seen by the fact that the display order for the transition pictures ranges from 00 to 11 and the first I-picture in the GOP has a display order of 12. As such, the transition is displayed before the first I-picture.

FIG. 16 illustrates a transition inserted between the first I-picture in the GOP and first P-picture in the GOP. As shown, the transition occurs after the initial I-picture and before the first P-picture. Once again, the first I-picture has a display order of 02, the transition pictures have a display order ranging from 03 to 14 and the first P-picture has a display order of 15. Thus, the transition is inserted between the first I-picture and the first P-picture of the GOP.

FIG. 17 illustrates a transition inserted later in the GOP between consecutive P-pictures. There it is seen that the first P-picture has a display order of 05, the transition has a display order ranging from 06 to 17 and the record P-picture has a display order of 18.5

Using P-pictures as transition pictures is more limited than using B-pictures because P-pictures only use macroblock types that refer to earlier reference pictures. However, because the P-pictures are available to be used as reference pictures, they enable the construction of compound transitions. They also enable more efficient construction of transitions such as fade-to-black and fade-to-white.

Figure 18:
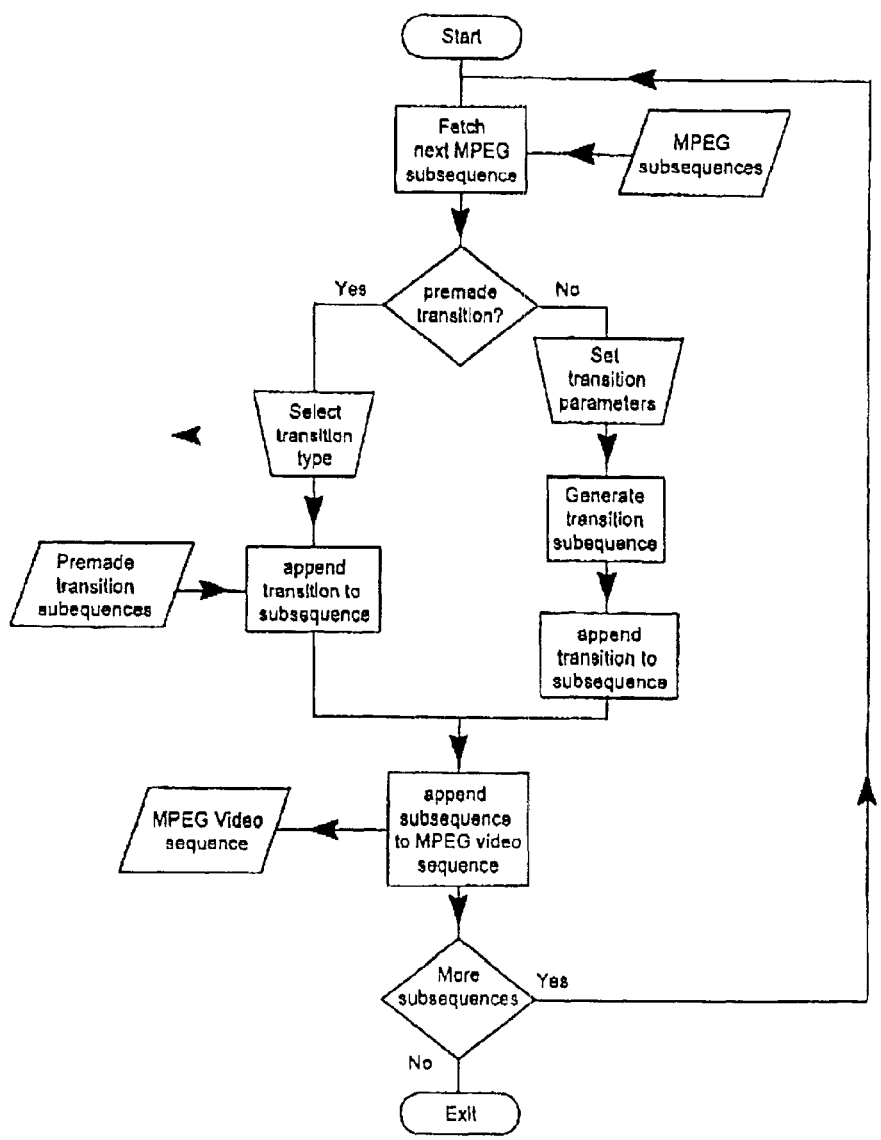
FIG. 18 is a flow chart that illustrates the steps that are followed in another embodiment of the invention that provides a video only (no audio) slideshow sequence given a series of closed (self contained) MPEG subsequences and a series of pre-made transitions or parameters from which a set of transitions are constructed according to any one of the embodiments disclosed above.

To further assist the addressee's understanding of the embodiments of the invention and the applications of those embodiments, there are provided some flow charts in FIGS. 18 to 22. The first flow chart, FIG. 18, illustrates the process for creating a video only—that is, no audio—slideshow sequence which takes a series of MPEG video subsequences (each subsequence being self contained or closed) and inserts an MPEG encoded transition (either a simple pre-made transition or one of the advanced transition which are generated on the fly) between each subsequence and outputs a video only sequence.

Figure 19:
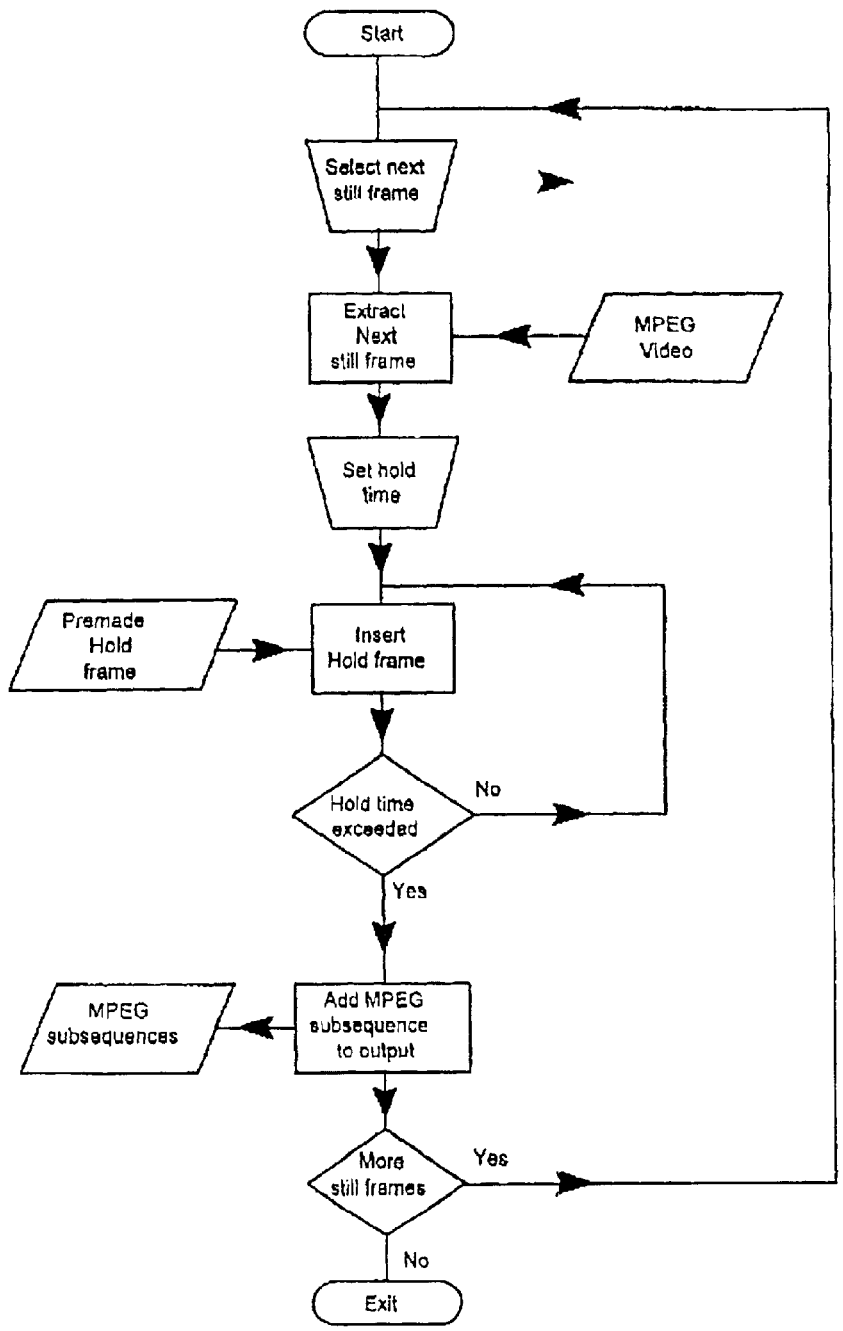
FIG. 19 is a flow chart that illustrates the steps that are followed in a further embodiment of the invention that provides a set of closed MPEG subsequences from still frames captured from MPEG video.
Figure 20:
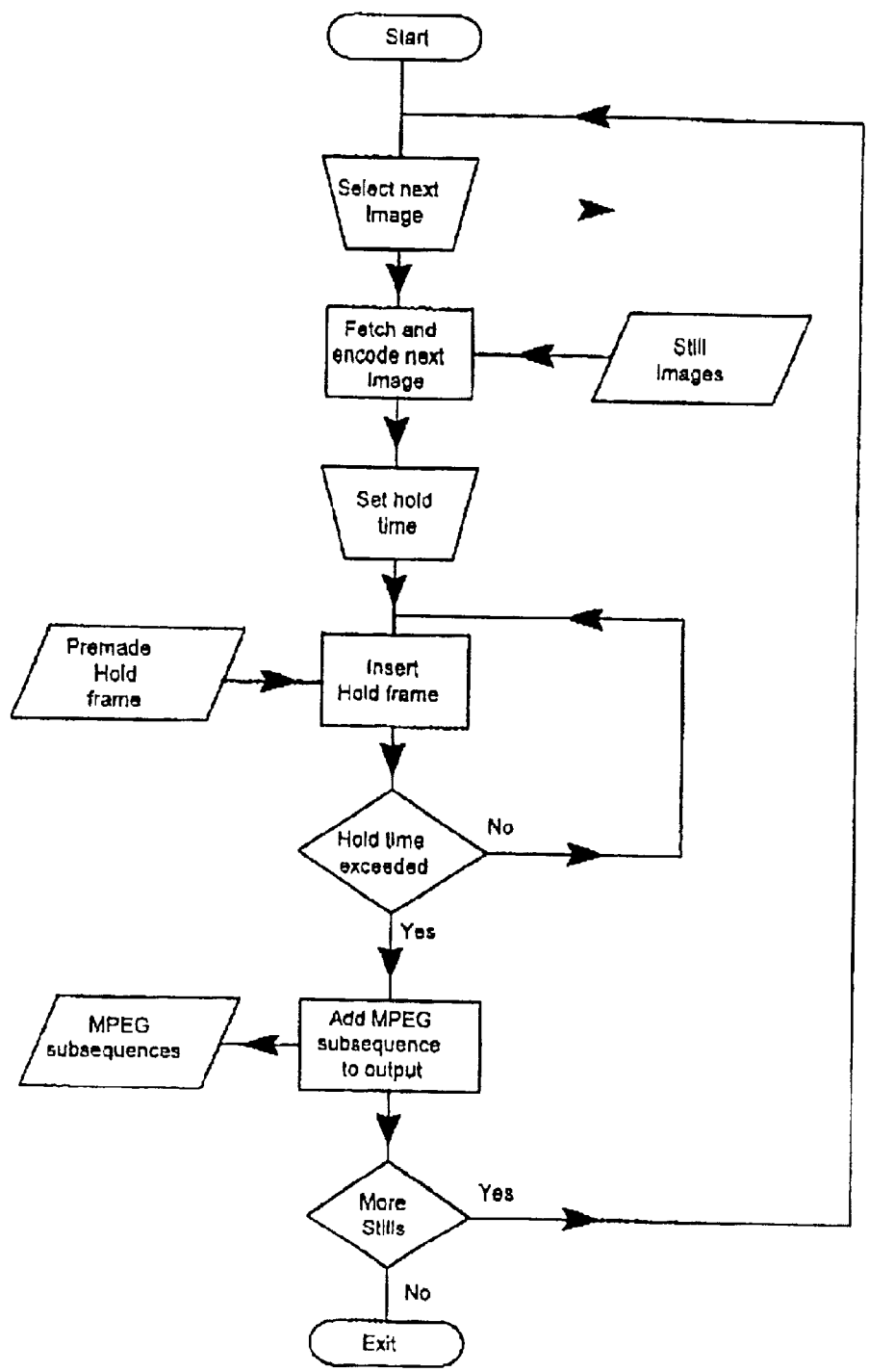
FIG. 20 is a flow chart that illustrates the steps that are followed in a still further embodiment of the invention that provides a set of closed MPEG subsequences from still frames encoded as MPEG frames from an image format such as JPEG.
Figure 21:
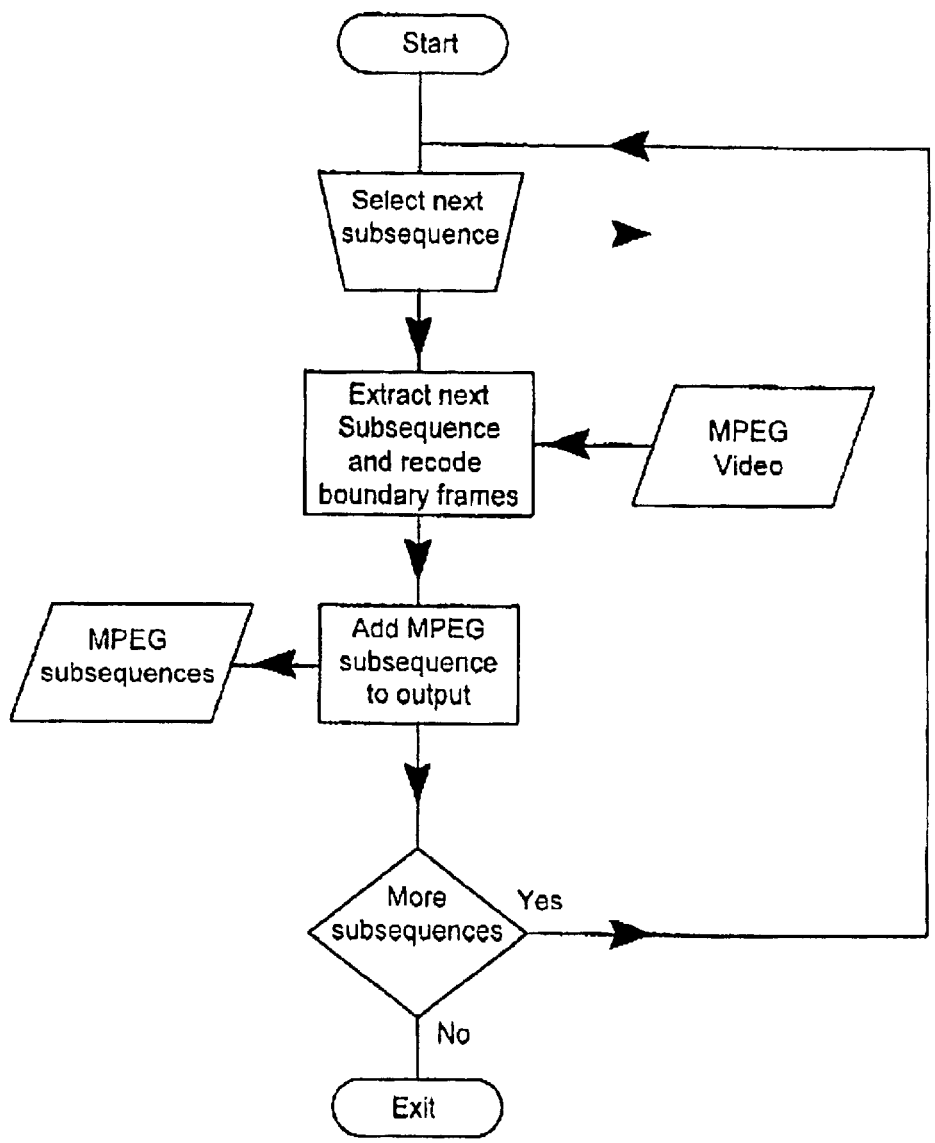
FIG. 21 is a flow chart that illustrates the steps that are followed in an alternative embodiment of the invention that provides a set of closed MPEG subsequences from MPEG subsequences extracted from an MPEG video.

The flow charts of FIGS. 19, 20 and 21 illustrate how to make a set of closed MPEG subsequences, such as those required in the process illustrated in FIG. 18, from the following respective sources:

1. Still frames captured from MPEG video;
2. Still frames encoded as MPEG frames from an image format such as JPEG; and
3. MPEG subsequences, extracted from an MPEG video.

For the last of the above three sources, if the section of MPEG drawn from the source material is not a closed subsequence, the first and last GOP are recoded to form a self contained closed subsequences.

Figure 22:
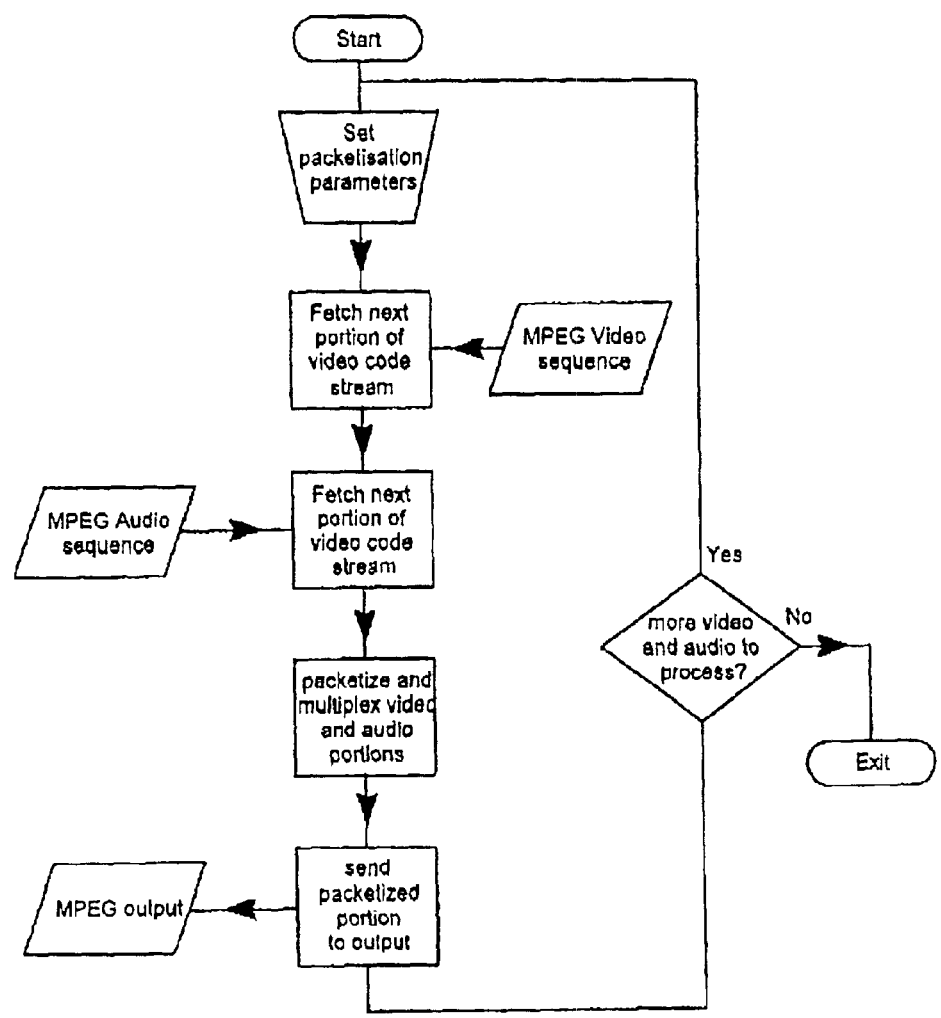
FIG. 22 is a flow chart that illustrates the process of multiplexing and packetising of a video only stream and an audio only stream to form a stream with video and audio.

The last flow chart, FIG. 22, illustrates the process of multiplexing and packetising of a video and audio stream and provides the addressee with additional context of the operating environment of the preferred embodiments. For the purposes of these embodiments, the video stream is the result of a process like that illustrated in the flow chart of FIG. 18 and the audio stream is either constructed from the original video material or generated from other audio sources.

Although the invention has been described with reference to specific examples, it will be appreciated by those skilled in the art that the invention may be embodied in many other forms,

What is claimed is:

1. A method of generating a transition template suitable for insertion between an arbitary past reference picture and a future reference picture in a compressed digital data stream to produce, upon decompression of said compressed diptal data stream, a desired transition between said past reference picture and said future reference picture, the method including the steps of:
   generating a series of transition pictures including a first transition picture and a last transition picture wherein each transition picture includes a series of rows of macroblocks, each row including a first macroblock and a last macroblock; and
   designating at least some of the macroblocks within each transition picture as either first predefined transition macroblocks or second predefined transition macroblocks; and
   designating a boundary between any first predefined transition macroblocks and neighbouring second predefined transition macroblocks as part of a transition boundary;
   designating all or almost all of the macroblocks in the first transition picture as first predefined transition macroblocks;
   for each new transition picture:
   copying a previous transition picture to form the next synthesised picture;
   changing some of the first predefined transition macroblocks in the new transition picture to second predefined transition macroblocks so as to change the position of the transition boundary; and
   continuing to copy and change pictures until the most recently created transition picture consists entirely or almost entirely of second predefined transition macroblocks.

2. A method according to claim 1 wherein the first pre-defined transition macroblocks include one or more of:
   (a) past copy macroblocks (PCMs) which copy a corresponding macroblock in the past reference picture;
   (b) fixture copy macroblocks (FCMs) which copy a corresponding macroblock in the future reference picture;
   (c) merge macroblock (MMs) which average the corresponding macroblocks from the past and future reference pictures;
   (d) offset copy macroblocks which references the past reference picture (POCM);
   (e) offset copy macroblocks which references the future reference picture (FOCM)
   (f) future fading macroblocks (FFMs) which reference the future reference picture and add a non-zero intensity offset to increase or decrease its intensity; or
   (g) past fading macroblocks (PFMs) which reference the past reference picture and add a non-zero intensity offset to increase or decrease its intensity.

3. A method according to claim 1 wherein the second pre-defined transition macroblocks include one or more of:
   (a) past copy macroblocks (PCMs) which copy a corresponding macroblock in the past reference picture;
   (b) future copy macroblocks (FCMs) which copy a corresponding macroblock in the future reference picture;
   (c) merge macroblock (MMs) which average the corresponding macroblocks from the past and future reference pictures;
   (d) offset copy macroblocks which references the past reference picture (POCM);
   (e) offset copy macroblocks which references the future reference picture (FOCM)
   (f) future fading macroblocks (FFMs) which reference the future reference picture and add a non-zero intensity offset to increase or decrease its intensity; or
   (g) past fading macroblocks (PFMs) which reference the past reference picture and add a non-zero intensity offset to increase or decrease its intensity.

4. A transition template suitable for insertion between an arbitary past reference picture and a future reference picture in a compressed digital data stream, to produce, upon decompression of said compressed digital data stream, a desired transition between said past reference picture and said future reference picture, the template including:
   a series of transition pictures wherein each transition picture includes a series of rows of macroblocks, each row including a first macroblock and a last macroblock;
   wherein at least some of the macroblocks are pre-defined transition macroblocks; and
   wherein said pre-defined transition macroblocks are arranged in said transition pictures so as to give the impression that the future reference picture is incrementally replacing the past reference picture.

5. A template according to claim 4 wherein the pre-defined transition macroblocks include one or more of:
   (a) past copy macroblocks (PCMs) which copy a corresponding macroblock in the past reference picture;
   (b) future copy macroblocks (FCMs) which copy a corresponding macroblock in the future reference picture;
   (c) merge macroblock (MMs) which average the corresponding macroblocks from the past and future reference pictures;
   (d) offset copy macroblocks which references the past reference picture (POCM);
   (e) offset copy macroblocks which references the future reference picture (FOCM)
   (f) future fading macroblocks (FFMs) which reference the future reference picture and add a non-zero intensity offset to increase or decrease its intensity; or
   (g) past fading macroblocks (PFMs) which reference the past reference picture and add a non-zero intensity offset to increase or decrease its intensity.

6. A wipe transition template suitable for insertion between an arbitrary past reference picture and a future reference picture in a compressed digital data stream, to produce, upon decompression of said compressed digital data stream, a wipe transition between said past reference picture and said future reference picture, the template including: to produce, upon decompression of said compressed digital data stream, a desired transition between said past reference picture and said future reference picture a series of transition pictures including a first transition picture and a last transition picture wherein each transition picture includes a series of rows of macroblocks, each row including a first macroblock and a last macroblock; and wherein the majority of the macroblocks are either:

past copy macroblocks (PCMs) which copy a corresponding macroblock in the past reference picture;

future copy macroblocks (FCMs) which copy a corresponding macroblock in the future reference picture; or merge macroblock (MMs) which average the corresponding macroblocks from the past and future reference pictures.

7. A template according to claim 6 wherein the pictures in the wipe transition are constructed from some PCMs and some FCMs.

8. A template according to claim 6 wherein the first transition picture is predominantly constructed from PCMs and in subsequent pictures the PCMs are progressively replaced by FCMs.

9. A template according to claim 6 wherein the regions of PCMs are contiguous and the regions of FCMs are contiguous.

10. A template according to claim 9 wherein, in successive pictures, macroblocks along the boundary between the contiguous regions of PCMs and FCMs are converted from PCMs to FCMs.

11. A template according to claim 9 wherein for some of the transition pictures at least some of the PCMs are replaced in subsequent pictures by MMs and in later transition pictures those MMs are replaced by FCMs.

* * * * *